(12) United States Patent
    Zarras

(10) Patent No.: US 9,116,931 B2
(45) Date of Patent: Aug. 25, 2015

(54) INTEGRATED, CONFIGURABLE, ANALYTICAL, TEMPORAL, VISUAL ELECTRONIC PLAN SYSTEM

(71) Applicant: Logic9s, LLC, New York, NY (US)

(72) Inventor: Dean Zarras, Bedford, NY (US)

(73) Assignee: Logic9s, LLC, New York, NY (US)

( * ) Notice: Subject to any disclaimer, the term of this patent is extended or adjusted under 35 U.S.C. 154(b) by 0 days.

(21) Appl. No.: 14/327,268

(22) Filed: Jul. 9, 2014

(65) Prior Publication Data

US 2015/0081727 A1    Mar. 19, 2015

Related U.S. Application Data

(60) Provisional application No. 61/845,536, filed on Jul. 12, 2013.

(51) Int. Cl.
    *G06F 17/30*    (2006.01)
    *G06F 17/20*    (2006.01)
    *G06F 17/24*    (2006.01)

(52) U.S. Cl.
    CPC .......... *G06F 17/30289* (2013.01); *G06F 17/20* (2013.01); *G06F 17/246* (2013.01)

(58) Field of Classification Search
    CPC .. G06F 17/30289; G06F 17/20; G06F 17/246
    See application file for complete search history.

(56) References Cited

U.S. PATENT DOCUMENTS

| | | | |
|---|---|---|---|
| 6,057,837 A * | 5/2000 | Hatakeda et al. | 715/765 |
| 6,185,582 B1 * | 2/2001 | Zellweger et al. | 715/212 |
| 6,256,649 B1 * | 7/2001 | Mackinlay et al. | 715/212 |
| 6,438,565 B1 * | 8/2002 | Ammirato et al. | 715/204 |
| 7,415,481 B2 | 8/2008 | Becker et al. | |
| 7,533,340 B2 * | 5/2009 | Hudson et al. | 715/711 |
| 7,647,551 B2 * | 1/2010 | Vigesaa et al. | 715/217 |
| 7,693,860 B2 * | 4/2010 | Babanov et al. | 715/212 |
| RE41,500 E * | 8/2010 | Shelton et al. | 715/217 |
| 7,797,621 B1 * | 9/2010 | Danner et al. | 715/220 |
| 7,805,433 B2 * | 9/2010 | Dickerman et al. | 707/713 |
| 7,849,396 B2 * | 12/2010 | Belmonte et al. | 715/219 |

(Continued)

OTHER PUBLICATIONS

International Searching Authority, Written Opinion for International Application No. PCT/US2014/053330, Date Mailed Dec. 5, 2014, 6 pgs.

*Primary Examiner* — Scott A Waldron
(74) *Attorney, Agent, or Firm* — Mintz Levin Cohn Ferris Glovsky and Popeo, P.C.

(57) ABSTRACT

An integrated, configurable, analytical, temporal, visual, electronic plan system includes one or more row descriptors that each include a plurality of row descriptor properties, column descriptors each including a plurality of column descriptor properties, cells mapped to one of the row descriptors by a unique row descriptor identifier and to one of the column descriptors by a unique column descriptor identifier, and each of the cells including a numeric formula or a user-defined formula that references other cells. The user-defined formula includes the unique row descriptor identifier and/or the unique column descriptor identifier from other cells initially expressed by an abbreviation associated with a row descriptor and/or an abbreviation associated with a column descriptor. Using the unique identifiers, changes to the natural language descriptions and/or abbreviations are automatically rendered to any formulas that reference them without having to reconfigure and/or persist new versions of those formulas.

24 Claims, 19 Drawing Sheets

(56) References Cited

U.S. PATENT DOCUMENTS

| | | |
|---|---|---|
| 7,949,937 B2 | 5/2011 | Wu |
| 8,032,822 B1 | 10/2011 | Artamonov et al. |
| 8,046,673 B2 | 10/2011 | Polo-malouvier et al. |
| 8,127,223 B2 * | 2/2012 | Becerra, Sr. et al. ......... 715/212 |
| 8,239,751 B1 | 8/2012 | Rochelle et al. |
| 8,321,780 B2 | 11/2012 | Erwig et al. |
| 8,386,533 B2 * | 2/2013 | Venkata Naga Ravi ...... 707/803 |
| 8,479,093 B2 | 7/2013 | Ravindran et al. |
| 8,549,392 B2 * | 10/2013 | Simkhay et al. .............. 715/212 |
| 8,782,508 B2 * | 7/2014 | Bauchot ........................ 715/212 |
| 8,812,298 B1 * | 8/2014 | Wolfram et al. ................. 704/9 |
| 2002/0023105 A1 | 2/2002 | Wisniewski .................. 707/503 |
| 2002/0078086 A1 * | 6/2002 | Alden et al. .................. 707/503 |
| 2003/0188258 A1 * | 10/2003 | Aureglia et al. ............. 715/503 |
| 2004/0225692 A1 * | 11/2004 | Pasumansky et al. ........ 707/200 |
| 2005/0251748 A1 | 11/2005 | Gusmorino et al. |
| 2006/0080594 A1 | 4/2006 | Chavoustie et al. |
| 2006/0080595 A1 | 4/2006 | Chavoustie et al. |
| 2007/0028159 A1 * | 2/2007 | Ying et al. .................... 715/503 |
| 2007/0055556 A1 | 3/2007 | Frank-backman et al. |
| 2007/0061698 A1 * | 3/2007 | Megiddo et al. ............... 715/503 |
| 2007/0101252 A1 * | 5/2007 | Chamberlain et al. ......... 715/503 |
| 2007/0244672 A1 * | 10/2007 | Kjaer ................................ 703/2 |
| 2007/0250295 A1 * | 10/2007 | Murray et al. .................... 703/2 |
| 2007/0282462 A1 * | 12/2007 | Sourov et al. ................... 700/17 |
| 2008/0046804 A1 * | 2/2008 | Rui et al. ........................ 715/212 |
| 2008/0148140 A1 * | 6/2008 | Nakano ......................... 715/215 |
| 2008/0168341 A1 | 7/2008 | Payette |
| 2010/0205521 A1 | 8/2010 | Folting |
| 2010/0251090 A1 * | 9/2010 | Chamberlain et al. ......... 715/217 |
| 2010/0251091 A1 * | 9/2010 | Jania ............................... 715/219 |
| 2010/0306639 A1 * | 12/2010 | Burr et al. ...................... 715/227 |
| 2010/0325526 A1 * | 12/2010 | Ellis et al. ...................... 715/217 |
| 2011/0072340 A1 * | 3/2011 | Miller et al. ................... 715/220 |
| 2013/0007607 A1 | 1/2013 | Caldwell et al. |
| 2013/0013994 A1 | 1/2013 | Handsaker et al. |
| 2013/0061123 A1 | 3/2013 | Rochelle et al. |
| 2013/0086459 A1 | 4/2013 | Folting et al. |
| 2013/0086460 A1 | 4/2013 | Folting et al. |
| 2013/0103615 A1 * | 4/2013 | Mun ............................ 705/36 R |
| 2014/0047312 A1 * | 2/2014 | Ruble et al. ................... 715/212 |
| 2014/0129912 A1 * | 5/2014 | Kannala et al. ............... 715/215 |
| 2015/0033105 A1 * | 1/2015 | Pigott et al. ................... 715/212 |

* cited by examiner

| | Time 1 (CD1) 44<br>June 2014, Jun 2014, 170<br>6/30/2014 (khax)<br>48 46 | Time 2 (CD2) 124<br>July 2014, Jul 2014,<br>7/31/2014 (pmxi)<br>222 128 126 | Time 3 (CD3)<br>August 2014, Aug 2014,<br>8/31/2014 (acht)<br>224 130 |
|---|---|---|---|
| Plan Attribute 1 (RD1)<br>Rate of Return, ROR, zxqx<br>24 26 28 | Rate of Return, June 2014<br>10%<br>58 | Rate of Return, July 2014<br>20%<br>60 | Rate of Return, August<br>2014, 15%<br>62 |
| Plan Attribute 2 (RD2)<br>Allocation to Stocks, 109<br>Stocks, qcyj 108 | Allocation to Stocks, June<br>2014, $50,000<br>64 | Allocation to Stocks, July<br>2014, $48,000<br>66 | Allocation to Stocks,<br>August 2014, $55,000<br>68 |
| Plan Attribute 3 (RD3)<br>Expected Profit In Stocks,<br>plStocks, bryv 154<br>110 120 | Expected Profit in Stocks,<br>June 2014, "ROR * Stocks"<br>94<br>70 | Expected Profit in Stocks,<br>July 2014, "ROR * Stocks"<br>72 | Expected Profit in Stocks,<br>August 2014, "ROR *<br>Stocks"<br>74 |
| Plan Attribute 4 (RD4) 160<br>Accumulated Stock Profit,<br>accStockPL, dfih<br>112 122 | Accumulated Stock Profit,<br>June 2014, "plStocks"<br>76 | Accumulated Stock Profit,<br>July 2014, "accStockPL"(-<br>1) + plStocks"<br>102<br>78 | Accumulated Stock Profit,<br>August 2014,<br>"accStockPL"(-1) +<br>plStocks"<br>80 |

Accumulated Stock Profit @ July 2014 = Accumulated Stock Profit from Prior Period + Expected Profit in Stocks Expected Profit in Stocks @ June 2014 = Rate of Return * Allocation to Stocks

Natural Language Cell Label     Natural Language Cell Formula     170

| Longer Investment Sim | | | | | | | | | | | | | ◢◻✕ |
|---|---|---|---|---|---|---|---|---|---|---|---|---|---|
| Describe ▼ Toolbars ▼ ∥ Both ▼ ∥ A □ ⎯⎯⎯⎯→ R D T ∥ Simulate∥ Restore Abbrevs □ | | | | | | | | | | | | | ◢ |
| Ranges: ○ Relative ⦿ Absolute ∥ Save | | | | | | | | | | | | | |
| Earnings from Stocks @ Feb 2013: | Starting Balance * (Percent Stocks / 100.0) * (ROR Stocks / 100.0) | | | | | | | | | | | | |
| Main | | | | | | | | | | | | | |
| Plan Attributes | | | | | | | 2013 | | | | | | |
| Name | Jan 2013 | Feb 2013 | Mar 2013 | Apr 2013 | May 2013 | Jun 2013 | Jul 2013 | Aug 2013 | Sep 2013 | Oct 2013 | Nov 2013 | Dec 2013 |
| Starting Balance | 185,000 | 181,300 | 182,388 | 175,457 | 214,409 | 225,129 | 236,385 | 248,205 | 260,615 | 273,646 | 389,124 | |
| Percent Stocks | 40 | 40 | 40 | 40 | 40 | 40 | 40 | 40 | 40 | 40 | 40 | |
| Percent Bonds | 40 | 40 | 40 | 40 | 40 | 40 | 40 | 40 | 40 | 40 | 40 | |
| Percent Gold | 20 | 20 | 20 | 20 | 20 | 20 | 20 | 20 | 20 | 20 | 20 | |
| ROR Stocks | 7 | 7 | -15 | 50 | 7 | 7 | 7 | 7 | 7 | 100 | 7 | |
| ROR Bonds | -15 | -8 | 3 | 3 | 3 | 3 | 3 | 3 | 3 | 3 | 3 | |
| ROR Gold | 6 | 5 | 5 | 5 | 5 | 5 | 5 | 5 | 5 | 5 | 5 | |
| Earnings from Stocks | 5,180 | 5,076 | -10,943 | 35,091 | 6,003 | 6,304 | 6,619 | 6,950 | 7,297 | 109,458 | 10,895 | |
| Earnings from Bonds | -11,100 | 802 | 2,189 | 2,105 | 2,573 | 2,702 | 2,837 | 2,978 | 3,127 | 3,284 | 4,669 | |
| Earnings from Gold | 2,220 | 1,813 | 1,824 | 1,755 | 2,144 | 2,251 | 2,364 | 2,482 | 2,606 | 2,736 | 3,891 | |
| Total Earnings | -3,700 | 1,088 | -6,931 | 38,951 | 10,720 | 11,256 | 11,819 | 12,410 | 13,031 | 115,478 | 19,456 | |
| Ending Balance | 181,300 | 182,388 | 175,457 | 214,409 | 225,129 | 236,385 | 248,205 | 260,615 | 273,646 | 389,124 | 408,580 | |
| Periodic ROR | -2 | 1 | -4 | 22 | 5 | 5 | 5 | 5 | 5 | 42 | 5 | |

228    172    174 "Current Cell"    180    12    30    14

| Longer Investment Sim: Main -- Timepoint report for May 2013 — 313 | | 340 |
|---|---|---|
| Plan Attribute | Formula | Value |
| ▿ 🗀 Roots — 342 | | |
| Percent Stocks | | 40.00 |
| Percent Bonds | | 40.00 |
| Percent Gold | | 20.00 |
| ROR Stocks | | 7.00 |
| ROR Bonds | | 3.00 |
| ROR Gold | | 5.00 |
| ▿ 🗀 Dependents — 344 | ⤺ 345 | |
| Starting Balance | Ending Balance from prior period | 214,408.53 |
| Earnings from Stocks | Starting Balance * (Percent Stocks / 100.0) * (ROR Stocks / 100.0) | 6,003.44 |
| Earnings from Bonds | Starting Balance * (Percent Bonds / 100.0) * (ROR Bonds / 100.0) | 2,572.90 |
| Earnings from Gold | Starting Balance * (Percent Gold / 100.0) * (ROR Gold / 100.0) | 2,144.09 |
| Total Earnings | Earnings from Stocks + Earnings from Bonds + Earnings from Gold | 10,720.43 |
| Ending Balance | Starting Balance + Total Earnings | 255,128.96 |
| Periodic ROR | (Total Earnings / Starting Balance) * 100.0 | 5.00 |

Longer Investment Sim

Describe ▼ | Toolbars ▼ | Parents | ⟨A⟩ —◯— R D T | Simulate! Restore Abbrevs ☐

Main

Plan Attributes

| Name | Jan 2013 | Feb 2013 | Mar 2013 | Apr 2013 | May 2013 | Jun 2013 | Jul 2013 | Aug 2013 | Sep 2013 | Oct 2013 | Nov 2013 | D |
|---|---|---|---|---|---|---|---|---|---|---|---|---|
| Starting Balance | 185,000 | 181,300 | | | 214,409 | 225,129 | 236,385 | 248,205 | 260,615 | 273,646 | 389,124 | |
| Percent Stocks | 40 | 40 | 40 | | 40 | 40 | 40 | 40 | 40 | 40 | 40 | |
| Percent Bonds | 40 | 40 | 40 | | 40 | 40 | 40 | 40 | 40 | 40 | 40 | |
| Percent Gold | 20 | 20 | 20 | | 20 | 20 | 20 | 20 | 20 | 20 | 20 | |
| ROR Stocks | 7 | 7 | -15 | | 7 | 7 | 7 | 7 | 7 | 100 | 7 | |
| ROR Bonds | -15 | -8 | 3 | | 3 | 3 | 3 | 3 | 3 | 3 | 3 | |
| ROR Gold | 6 | 5 | 5 | | 5 | 5 | 5 | 5 | 5 | 5 | 5 | |
| Earnings from Stocks | 5,180 | 5,076 | | | 6,003 | 6,304 | 6,619 | 6,950 | 7,297 | 109,458 | 10,895 | |
| Earnings from Bonds | -11,100 | -5,802 | | | 2,573 | 2,702 | 2,837 | 2,978 | 3,127 | 3,284 | 4,669 | |
| Earnings from Gold | 2,220 | 1,813 | | | 2,144 | 2,251 | 2,364 | 2,482 | 2,606 | 2,736 | 3,891 | |
| Total Earnings | -3,700 | 1,088 | | | 10,720 | 11,256 | 11,819 | 12,410 | 13,031 | 115,478 | 19,456 | |
| Ending Balance | 181,300 | 182,388 | | | 225,129 | 236,385 | 248,205 | 260,615 | 273,646 | 389,124 | 408,580 | |
| Periodic ROR | -2 | 1 | -4 | 22 | 5 | 5 | 5 | 5 | 5 | 42 | 5 | |

Highlighting enabled

| ClearFactor Plan Report for Longer Investment Sim | 226 - 246 | | |
|---|---|---|---|
| ☐ Statistics ☑ Highlighting | 172 | | |
| ☐ Attribute | Time Period | Description | |
| ☐ Starting Balance | Jan 2013 | | 390 |
| ☐ | Feb 2013 -- Sep 2015 | | 392 |
| ☐ | Oct 2013 -- Jan 2016 | | 390 |
| ☐ Percent Stocks | Entire plan | | |
| ☐ Percent Bonds | Entire plan | | |
| ☐ Percent Gold | Entire plan | | |
| ☐ ROR Stocks | Entire plan | | |
| ☐ ROR Bonds | Entire plan | | |
| ☐ ROR Gold | Entire plan | | |
| ☐ Earnings from Stocks | Jan 2013 -- Sep 2015 | | 392 |
| ☐ | Oct 2015 -- Jan 2016 | | 390 |
| ☐ Earnings from Bonds | Jan 2013 -- Sep 2015 | | 392 |
| ☐ | Oct 2015 -- Jan 2016 | | 390 |
| ☐ Earnings from Gold | Jan 2013 -- Sep 2015 | | 392 |
| ☐ | Oct 2015 -- Jan 2016 | | 390 |
| ☐ Total Earnings | Jan 2013 -- Sep 2015 | | 392 |
| ☐ | Oct 2015 -- Jan 2016 | | 390 |
| ☐ Ending Balance | Jan 2013 -- Sep 2015 | | 392 |
| ☐ | Oct 2015 -- Jan 2016 | | 390 |
| ☐ Periodic ROR | Jan 2013 -- Aug 2013 | | |
| ☐ | Sep 2013 | | 392 |
| ☐ | Oct 2013 -- Jul 2015 | | |
| ☐ | Aug 2015 | | |
| ☐ | Sep 2015 | | |
| ☐ | Oct 2015 -- Jan 2016 | | 390 |

Longer Investment Sim

File ▼ | Configure ▼ | Toolbars ▼ | Edit  ☑ Auto Save  ☑ Variables  ☐ Drivers

Description: Starting Balance  Auto-Naming: CamelBack Without Vowels ▼  Abbre

Value: 5076.4000000000

Earnings from Stocks at Feb 2013: sBal*(prcntStks/100.0)*(ro

| | Abbreviation | Description |
|---|---|---|
| | periodicROR | Periodic ROR |
| | rorBnds | ROR Bonds |
| | rorGold | ROR Gold |
| | rorStks | ROR Stocks |

420

| Main | | | | |
|---|---|---|---|---|
| Attribute | Abbrev | Jan | Feb | Mar |
| Starting Balance | sBal | 185,000.00 | 181,300.00 | 182,387.60 |
| Percent Stocks | prcntStks | 40.00 | 40.00 | 40.00 |
| Percent Bonds | prcntBnds | 40.00 | 40.00 | 40.00 |
| Percent Gold | prcntGld | 20.00 | 20.00 | 20.00 |
| ROR Stocks | rorStks | 7.00 | 7.00 | -15.00 |
| ROR Bonds | rorBnds | -15.00 | -8.00 | 3.00 |
| ROR Gold | rorGold | 6.00 | 5.00 | 5.00 |

*FIG. 18*

INTEGRATED, CONFIGURABLE, ANALYTICAL, TEMPORAL, VISUAL ELECTRONIC PLAN SYSTEM

RELATED APPLICATIONS

This application claims the benefit of and priority to U.S. Provisional Application Ser. No. 61/845,536, filed on Jul. 12, 2013 under 35 U.S.C. §§119, 120, 363, 365, and 37 C.F.R. §1.55 and §1.78.

FIELD OF THE INVENTION

This invention relates to an integrated, configurable, analytical, temporal, visual electronic plan system.

COMPUTER PROGRAM LISTING APPENDIX

A computer program listing appendix is submitted on a compace disc and the materials inclused on the compact disc is hereby incorporated by reference. Two compact discs are submitted. The compact discs are labeled as "Copy 1" and "Copy 2", respectively. The number of files on each compact disc is one. The file name on each compact disc is "14327268".

BACKGROUND OF THE INVENTION

An electronic spreadsheet allows a user to enter a combination of data and formulaic relationships between the data into a matrix. Each cell of the matrix holds either a single data item or a formula describing the computed relationship to one or more other cells. The power of the electronic spreadsheet becomes readily apparent when one realizes that any given computed cell can serve as input data to another computed cell. This allows for financial data analysis models of arbitrary complexity to be constructed with any number of possible benefits to the user.

The flexibility and unstructured nature of a typical conventional electronic spreadsheet application may cause data modeling relationships to become exceedingly difficult to understand, even by the original author of the spreadsheet. Additionally, changes to one part of the data model can lead to unexpected breakdowns elsewhere in the spreadsheet. Enacting counter-measures against such breakdowns is time-consuming, tedious and error-prone.

Additionally, for all of the computational capabilities of a typical spreadsheet application, the resulting analysis that can be performed is typically limited to changes in one or two independent variables at a time and then visually observing a few dependent variables downstream. In a complex data model, such as those found in a conventional electronic financial model, there may be many dependent and independent variables. Thus, it may be significantly challenging to be able to modify all of these variables and see the resulting changes in and from numerous potential inputs. As a result, there may be a reduction in understanding of the model itself. Highly-derived values and complex high-order relationships between various aspects of the model become extremely difficult to discern.

Conventional electronic spreadsheets used in financial modeling which include a temporal component may be referred to as electronic planning systems. Conventional electronic planning systems may enable users to build sophisticated financial models with complex formulaic relationships between various aspects of the model. "Sensitivity analysis" as used herein describes the study of one or more calculation results deriving from one or more changes to an input variable. Conventional electronic planning systems typically express the terms of the inputs to the analysis, the formulae, and outputs from the analysis in short cryptic abbreviated terms. This makes sensitivity analysis cumbersome and confusing because the short cryptic abbreviated terms may not clearly express their meaning in natural language terms that can be easily understood. As a result, there may be a reduction in understanding of the financial model itself.

To overcome this, users often construct elaborate copies of input and output data to transform one or both data sets into terms more conducive to the desired analysis. Such a technique is tedious, error prone, can hide resulting calculation flaws, and cannot provide the needed sensitivity analysis. The workflow involved makes ad hoc analysis and data exploration next to impossible.

SUMMARY OF THE INVENTION

In one aspect, an integrated, configurable, analytical, temporal, visual, electronic plan system is featured. The system includes one or more programs, wherein the one or more programs are stored in a memory and configured to be executed by one or more processors, the programs including instructions to generate an electronic plan including one or more row descriptors each including a plurality of row descriptor properties, one or more column descriptors each including a plurality of column descriptor properties, one or more cells mapped to one of the row descriptors by a unique row descriptor identifier and to one of the column descriptors by a unique column descriptor identifier, and each of the one or more cells including a numeric formula or a user-defined formula that references one or more other cells, the user-defined formula including the unique row descriptor identifier and/or the unique column descriptor identifier from one or more other cells initially expressed by an abbreviation associated with a row descriptor and/or an abbreviation associated with a column descriptor. A formula parser is configured to translate the abbreviation for the row descriptor and/or the abbreviation for the column descriptor to its corresponding unique row descriptor identifier and/or unique column descriptor identifier. A natural language report module is configured to substitute any unique row identifier and/or any unique column descriptor identifier in the user-defined formula with a corresponding natural language description or abbreviation to render the user-defined formula in natural language terms or abbreviated terms.

In one embodiment, the plurality of row descriptor properties may include one or more of: a natural language description, an abbreviation, and a unique row descriptor identifier. The plurality of column descriptor properties may include one or more of: a natural language description, an abbreviation, and a unique column descriptor identifier. The one or more row descriptors may define one or more plan attributes. The one or more column descriptors may define one or more time points. The one or more column descriptors may define one or more plan attributes. The one or more row descriptors may define one or more time points. The system may further include a column descriptor defining module responsive to user input configured to define one of the column descriptors. The column descriptor defining module may be configured to input a column descriptor in natural language terms and assign an abbreviation and a unique column descriptor identifier for the column descriptor. The system may include a row descriptor defining module responsive to user input configured to define one of the row descriptors. The row descriptor defining module may be configured to input a row descriptor in natural language terms and assign an abbreviation and a unique row descriptor identifier for the row descriptor. The system may include a formula defining module responsive to user input configured to define the user-defined formula. The system may include a time point defining module responsive to user input configured to capture at least one user-defined time period associated with the plan and assign the user-defined period to one of the column descriptor properties. The natural report language module may be responsive to the user-defined time period and may be configured to determine which of the one or more cells are relevant to the user-defined time period. The natural language report module may be configured to assemble a plurality of user-defined formulas associated with the one or more cells relevant to the user-defined time period. The natural language report module may be configured to substitute any unique row identifier and/or any unique column descriptor identifier in the plurality of user-defined formula with a corresponding natural language description or the abbreviation to render the plurality of user-defined formulas in natural language terms or abbreviated terms. The natural language report module may be configured to factor out repetitive formulae. The natural language report module may be configured to organize the natural language terms or abbreviated terms according to cell type. The natural language report module may be configured to organize the natural language terms or abbreviated terms according to cell type for all time points in the plan to provide a comprehensive view of the data and formulaic relationships of the entire plan. The natural language report module may be configured to substitute any unique row identifier associated with each of the one or more row descriptors and any unique column identifier associated with each of the one or more column descriptors to display each of the one or more row descriptors and each of the one or more column descriptors in natural language terms or abbreviated terms. The system may include a root cell display module configured to visually highlighting root cells. The system may further include a dependency display module configured to visually highlighting and displaying dependent cells. The system may include a terminal display module configured to visually highlighting display terminal cells. The system may include an ancestry display module for visually highlighting ancestry of root cells, dependent cells, and terminal cells.

In another aspect, a computer program product having program code stored on a non-transitory computer-readable medium, which when executed by at least one computing device, causes the at least one computing device to generate an electronic plan including one or more row descriptors each including a plurality of row descriptor properties, one or more column descriptors each including a plurality of column descriptor properties, one or more cells mapped to one of the row descriptors by a unique row descriptor identifier and to one of the column descriptors by a unique column descriptor identifier, and each of the one or more cells includes a numeric formula or a user-defined formula that references one or more other cells, the user-defined formula includes the unique row descriptor identifier and/or the unique column descriptor identifier from one or more other cells initially expressed by an abbreviation associated with a row descriptor and/or an abbreviation associated with a column descriptor. A formula parser is configured to translate the abbreviation for the row descriptor and/or the abbreviation for the column descriptor to its corresponding unique row descriptor identifier and/or unique column descriptor identifier. A natural language report module is configured to substitute any unique row identifier and/or any unique column descriptor identifier in the user-defined formula with a corresponding natural language description or abbreviation to render the user-defined formula in natural language terms or abbreviated terms.

In another aspect, a method executed on a computing device for generating an integrated, analytical, temporal, electronic plan, the method includes assigning one or more row descriptors each including a plurality of row descriptor properties to one or more rows of an electronic plan, assigning one or more column descriptors each including a plurality of column descriptor properties to one or more columns of an electronic plan, mapping one or more cells to one of the row descriptors by a unique row descriptor identifier and to one of the column descriptors by a unique column descriptor identifier, each of the one or more cells including a numeric formula or a user-defined formula that references one or more other cell, the user-defined formula including the unique row descriptor identifier and/or the unique column descriptor identifier from one or more other cells initially expressed by an abbreviation associated with a row descriptor and/or an abbreviation associated with a column descriptor, translating the abbreviation for the row descriptor and/or the abbreviation for the column descriptor to its corresponding unique row descriptor identifier and/or unique column descriptor identifier, and substituting any unique row identifier and/or any unique column descriptor identifier in the user-defined formula with a corresponding natural language description or abbreviation to render the user-defined formula in natural language terms or abbreviated terms.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 3 is a schematic block diagram of the electronic plan shown in FIG. 2 showing examples of one or more cells mapped to row descriptors and the column descriptors and examples of user-defined formulas expressed in natural language terms or a combination of natural language terms and abbreviated terms;

FIG. 4 is a view of another example of an electronic plan generated by the system shown in FIGS. 1A and 1B with row descriptors and column descriptors and an example of a user-defined formula associated with a particular cell expressed in abbreviated terms;

FIG. 5 is a view showing one example of abbreviations associated with the row descriptors shown in FIG. 4;

FIG. 6 is a view showing on example of a user-defined formula shown in FIG. 4 expressed in abbreviated terms now expressed in natural language terms;

FIG. 7 is a view showing one example of all natural language formulas associated with the plan shown in FIG. 4 for a selected time point grouped by root cells and dependent cells;

FIG. 8 is a view showing one example of self-describing spreadsheet report generated by the system shown in FIGS. 1A and 1B which may include all the user-defined formulas for the entire plan shown FIG. 4 expressed in natural language terms with the formulas grouped by the time periods to which they apply within the grouping by row descriptor.

FIG. 9 is a view showing one example of the plan shown in FIG. 4 with dependent cells highlighted;

FIG. 13 is a view showing one example of the plan shown in FIG. 4 with ancestry highlighting enabled showing the parent cells of the current cell;

FIG. 16 is a view showing one example of a self-describing spreadsheet plan report generated by the system shown in one or more of FIGS. 1A-15 with visually highlighted root and dependent cells;

FIG. 18 is a view showing one example of an auto-complete drop-down box which may be used to assist a user in entering one or more row descriptor abbreviations in a user-defined formula.

DETAILED DESCRIPTION OF THE INVENTION

Figure 1A:
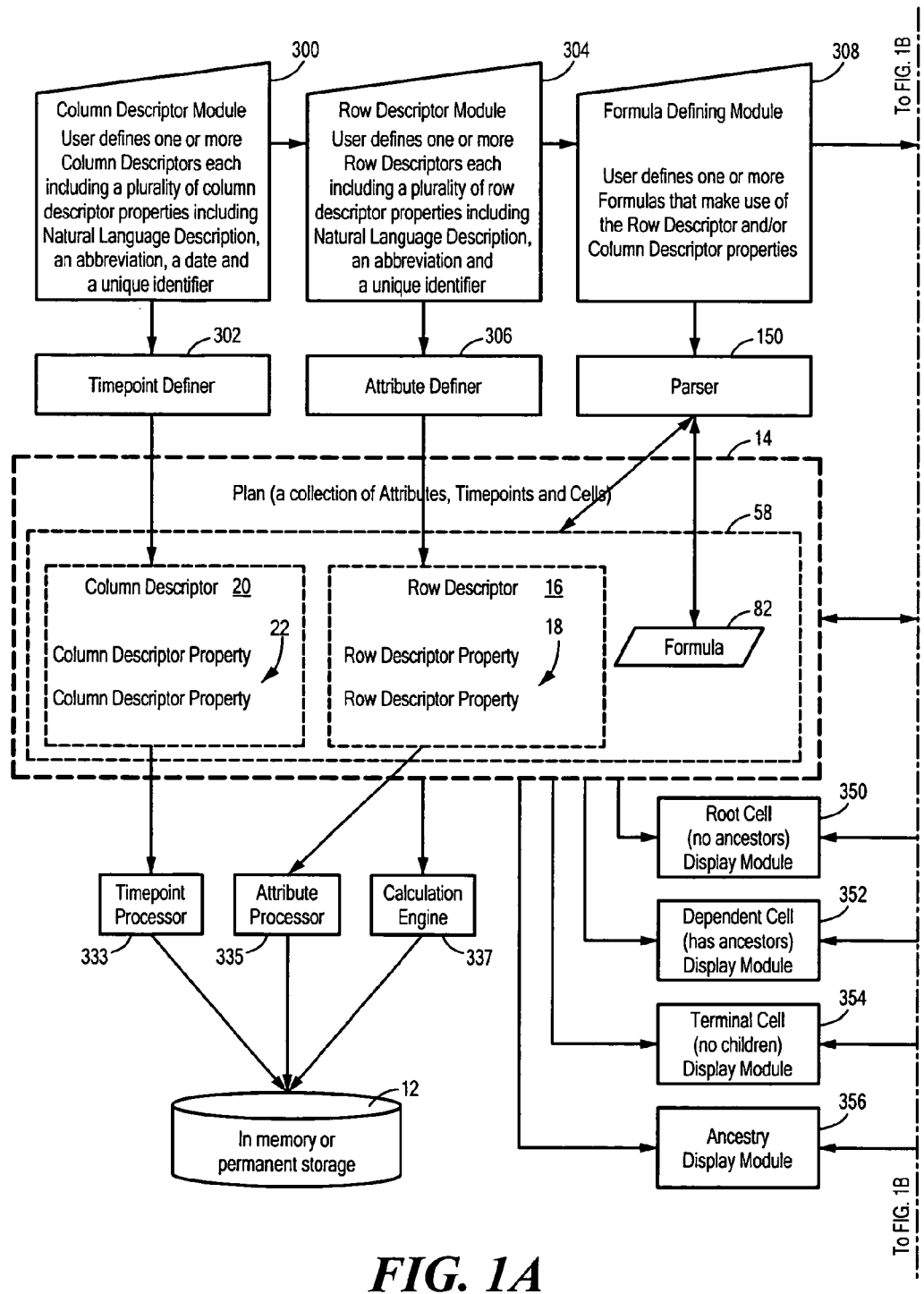
FIGS. 1A and 1B are schematic block diagrams showing the primary components of one embodiment of the integrated, analytical, temporal, visual electronic plan system of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As will be appreciated by one skilled in the art, one or more embodiments of this invention may be embodied as a system, method or computer program product. One or more embodiments this invention may take the form of an entirely hardware embodiment, an entirely software embodiment (including firmware, resident software, micro-code, and the like) or an embodiment combining software and hardware aspects that may all generally be referred to herein as a "module", "engine" or "system." One or more embodiments of this invention may take the form of a computer program product embodied in one or more computer-readable medium(s) having computer readable program code/instructions embodied thereon.

Any combination of computer-readable media or memory may be utilized. The computer-readable media or memory may be a computer-readable signal medium or a computer-readable storage medium. A computer-readable storage medium or memory may be, an electronic, magnetic, optical, electromagnetic, infrared, or semiconductor system, apparatus, or device, or any suitable combination of the foregoing. Other examples may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. As disclosed herein, the computer-readable storage medium or memory may be any tangible medium that can contain, or store one or more programs for use by or in connection with one or more processors on a company device such as a computer, a tablet, a cell phone, a smart device, or similar type device.

Computer program code for the one or more programs for carrying out the instructions or operation of one or more embodiments of this invention may be written in any combination of one or more programming languages, including an object oriented programming language, e.g., C++, Smalltalk, Java, and the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

One of more embodiments of this invention are disclosed below with reference to flowchart illustrations and/or block diagrams of methods, systems and computer program products. Each block of the flowchart illustrations and/or block diagrams, and combinations thereof may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1B:
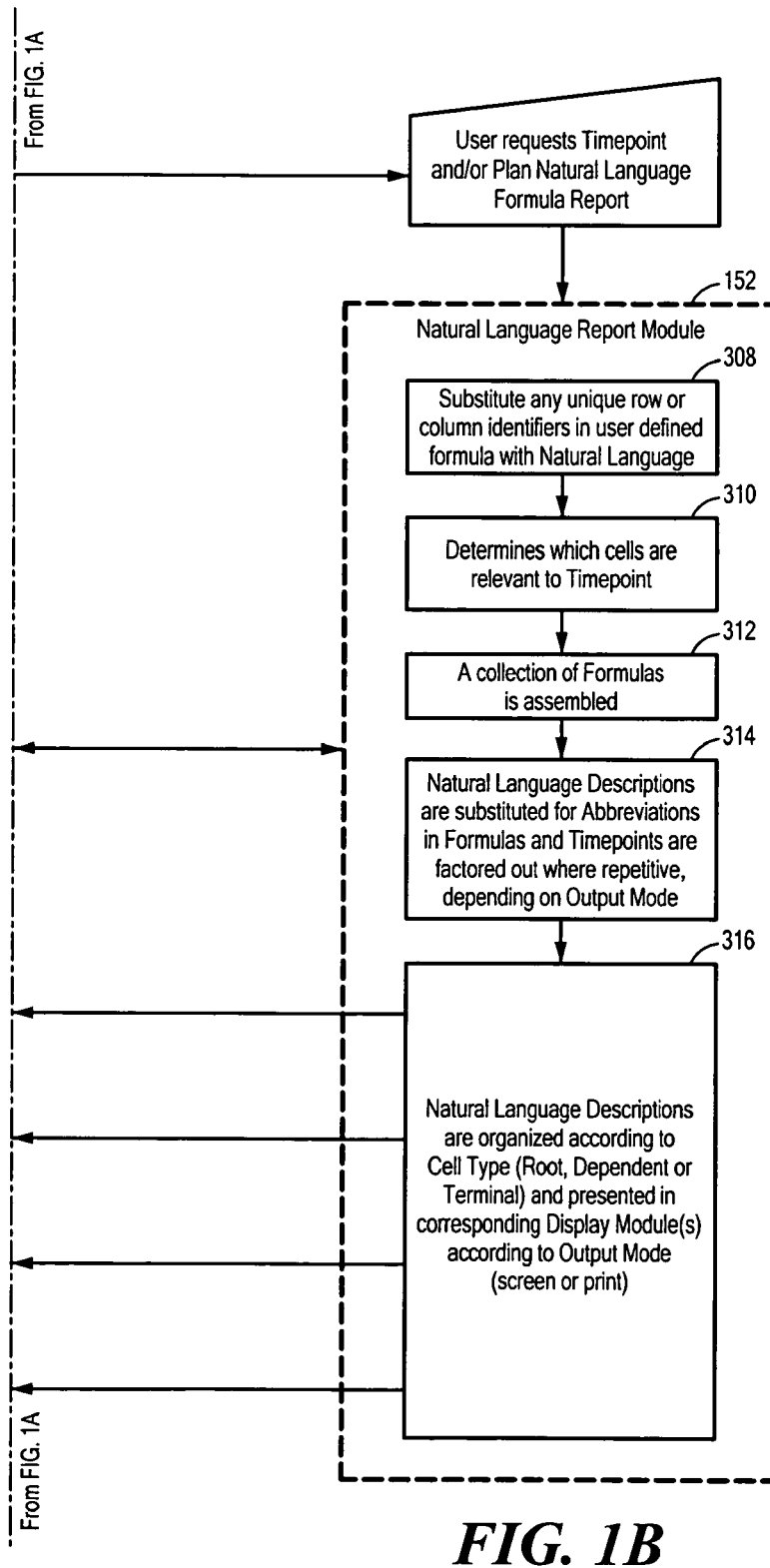

There is shown in FIGS. 1A and 1B, one embodiment of integrated, configurable, analytical, temporal, visual electronic plan system 10 of this invention. System 10 includes one or more programs, wherein the one or more programs are stored in a memory, e.g., memory 12, and configured to be executed by one or more processors, e.g., one or more of processors 333, 335, 337, the programs including instructions to generate integated, configurable, analytical, temporal, visual electronic plan system 10. System 10 includes electronic plan 14 including one or more row descriptors 16 each including a plurality of row descriptor properties 18. Electronic plan 14 also includes one or more column descriptors 20 each including a plurality of column descriptor properties 22. In one example, row descriptor properties 16 may include a natural language description, an abbreviation, and a unique row identifier. Similarly, column descriptor properties 22 may include a natural language description, an abbreviation, and a unique column identifier. In one design, column descriptor properties 22 and/or row descriptor properties 18 may include a time point, as discussed below.

Figure 2:
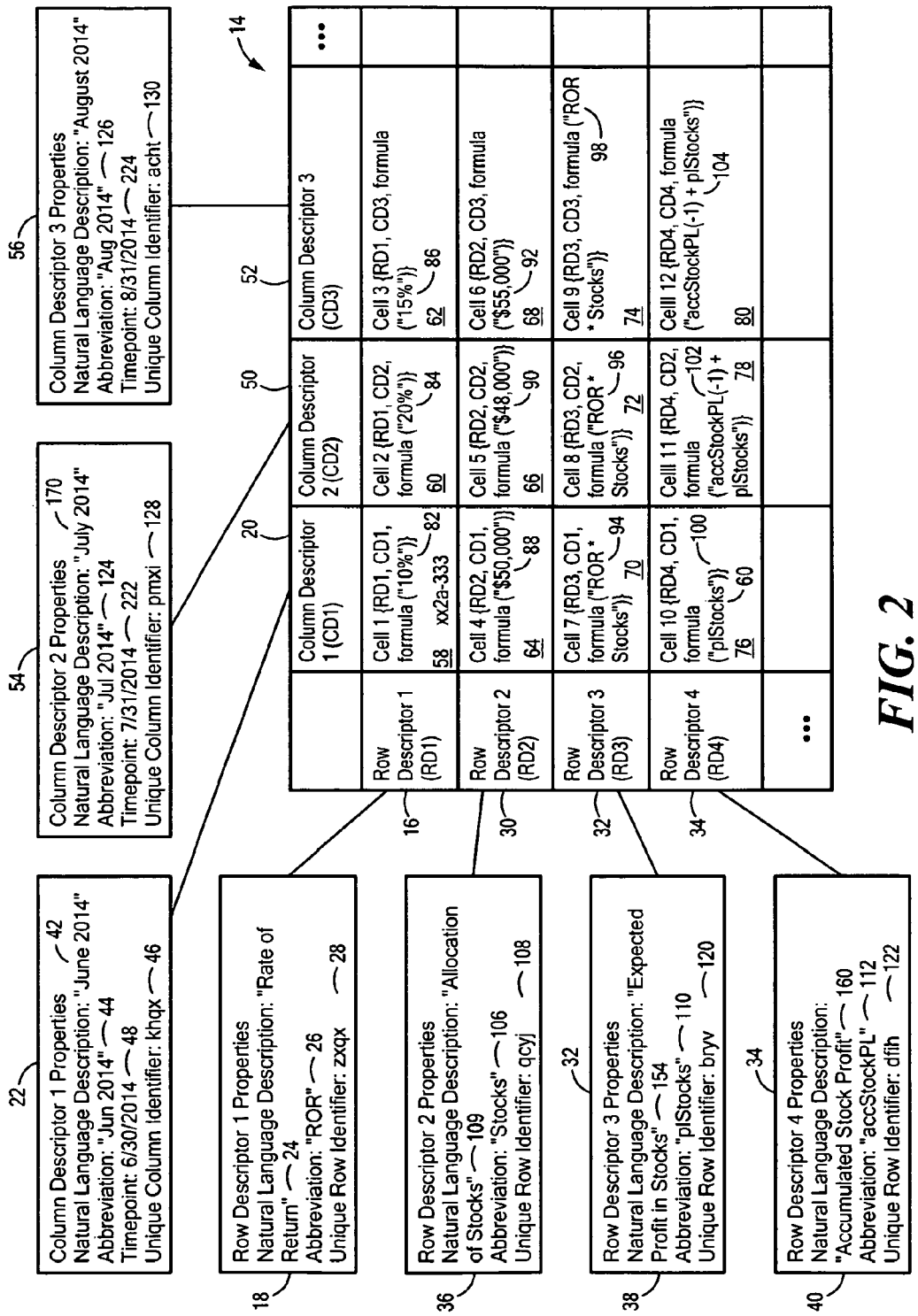
FIG. 2 is a schematic block diagram showing in further detail one example of the electronic plan system shown in FIGS. 1A and 1B including row descriptors each having a plurality of row descriptor properties and column descriptors each having a plurality of column descriptors properties.

For example, FIG. 2, where like parts have been given like numbers, shown an example of plan 14 that includes row descriptor 16, indicated as "Row Descriptor 1 (RD1)" which includes a plurality of row descriptor properties 18. In this example, row descriptor properties 18 includes the natural language description "rate of return"-24, the abbreviation "ROR"-26, and a unique row identifier zxqx-28.

Plan 14 may include any number of row descriptors as needed to define plan 14. In this example, plan 14 may include row descriptor 30, indicated as Row Descriptor 2 (RD2), row descriptor 32, indicated as Row Descriptor 3 (RD3), and row descriptor 34, indicated as Row Descriptor 4 (RD4). Each of row descriptors 30, 32, and 34 includes a plurality of row descriptor properties, e.g., row descriptor properties 36, 38, and 40, respectively, which include a natural language description, an abbreviation, and a unique row identifier as shown.

Plan 14, FIGS. 1A and 2, also includes column descriptor 20, indicated as "Column Descriptor 1 (CD1)", FIG. 2, which includes a plurality of column descriptor properties 22. In this example, column descriptor properties 20 preferably include the natural language description "June 2014"-42, the abbreviation "June 2014"-44, the unique column identifier khqx-46, and the time point "6/30/2014"-48.

Plan 14 may include any number of column descriptors as needed to define plan 14. For example, plan 14 may include column descriptor 50, indicated as Column Descriptor 2 (CD2) and column descriptor 52 indicated as column Descriptor 3 (CD3). Each of column descriptors 50 and 52 preferably include column descriptor properties 54 and 56, respectively, which may include a natural language description, an abbreviation, a unique row identifier and a time point as shown.

Although as shown in FIG. 2, plan 14 includes four row descriptors 18, 36, 38, 40 and three column descriptors 20, 50, and 52, plan 14 may include any number of row descriptors and column descriptors need to define plan 14, as known by those skilled in the art. In the example shown in FIG. 2, the column descriptor properties include the time point. In other examples, the row descriptor properties may include the time point.

Electronic plan 14, FIGS. 1A and 2, also include one or more cells 58 mapped to one of the row descriptors by the unique row descriptor identifier and to one of the column descriptors by a unique column identifier. For example, plan 14, FIG. 2, may include cell 58, shown as "Cell 1", which is mapped to row descriptor 16 (RD1) by unique row identifier zxqx-28 and to column descriptor 20 (CD1) by unique column identifier khqx-46. Similarly, cell 60, shown as "Cell 2", is mapped to row descriptor 16 (RD1) by unique row identifier zxqx-28 and to column descriptor 30 by unique column identifier pmxi-128. In this example, cells 62-80 are preferably mapped in a similar manner to the row descriptors and the column descriptors by the unique row descriptor identifier and unique column description identifier as shown. Although as shown in FIG. 2, plan 14 includes cells twelve cells 58-80, this is for exemplary purposes only as plan 14 need only include at least one cell, e.g., cell 58, and may include any number of cells as needed to define an electronic plan as known by those skilled in the art.

Each of the one or more cells 58, FIG. 1A, includes its own formula 82. Formula 82 may be a user-defined formula that references one or more other cells or a numeric formula. For the example shown in FIG. 2, cells 58-68 include numeric formulas indicated at 82, 84, 86, 88, 90, and 92, respectively, and cells 70-80 include user-defined formulas indicated at 94, 96, 98, 100, 102, and 104, respectively, that reference one or more other cells.

The user-defined formula includes the unique row descriptor identifier and/or the unique column descriptor identifier from one or more other cells that are initially expressed by an abbreviation associated with a row descriptor and/or the abbreviation associated with the column descriptor. For example, cell 70 includes the user-defined formula 94 initially expressed in the abbreviated form "ROR*Stocks". The abbreviation "ROR", indicated at 26, is one of row descriptor properties 18 for row descriptor 16. Unique row identifier zxqx-28 is also one of the row descriptor properties 18 for row descriptor 16 and, as discussed above, is used to map at least cell 58. The abbreviation "Stocks", indicated at 106, in formula 94 is one of row descriptor properties 36 for row descriptor 30. Unique row identifier qcyj-108 is also one of the row descriptor properties 36 for row descriptor 30, used to map at least cell 64. Thus, the user-defined formula 94 in cell 70 initially expressed in the abbreviated terms "ROR*Stocks" includes unique row identifier zxqx-28 and unique row identifier qcyj-108 from cells 58 and 60. User-defined formulas 96-104 for cells 72-88 are similarly initially expressed in abbreviated terms and include the unique row identifiers as shown in one or more of row descriptor properties 18, 36, 38, and 40 as shown.

System 10, FIGS. 1A and 1B, also includes parser 150, FIG. 1A, configured to translate the abbreviation for the row descriptor and/or the abbreviation for the column descriptor to its corresponding unique row descriptor identifier and/or unique column descriptor identifier. For example, parser 150 may translate any of the abbreviations associated with row descriptors 16, 30, 32, and 34, FIG. 2, e.g., abbreviation "ROR"-26, "Stocks"-106, "plStocks"-110 and "accStock-sPL"-112 of row descriptor properties 18, 36, 38, and 40, respectively, to their corresponding unique row identifiers, e.g., zxqx-28, qcyj-108, bryw-120, an dfih-122, respectively. In this example, parser 150 may also translate any of the abbreviations associated with column descriptors 20, 50, and 52, e.g., the abbreviation "June 2014"-44, "July-2014"-124 or "August 2014"-126 of column descriptor properties 22, 54, and 56, respectively, to their corresponding unique column descriptor identifier, e.g., khqx-46, pmxi-128, and acht-130.

System 10, FIGS. 1A and 1B, also includes natural report language module 152, FIG. 1B, configured to substitute any unique row identifier and/or any unique column descriptor identifier in the user-defined formula with a corresponding natural language description or abbreviation to render the user-defined formula in natural language terms or abbreviated terms, step 308. For example, FIG. 3, where like parts have been given like numbers, shown an example of plan 14 wherein natural report language module 152, FIG. 1B, has substituted unique row identifier zxqx-28 in the formula "ROR*stocks"-94 with the natural language description "Rate of Return"-24 and the substituted unique row identifier qcyj-108, with the natural language description "Allocation to Stocks"-109. The result is user-defined formula 94 initially expressed as "ROR*Stocks"-94 is now expressed in natural language terms as "Rate of Return*Allocation to Stocks", indicated at 154, FIG. 3.

Natural report language module 152, FIG. 1B, also preferably substitutes each of the unique row descriptor identifiers and each of the unique column descriptor identifiers used to map the one or more cells with the corresponding natural language description to identify each of the cells in the natural language terms.

For example, natural report language module 152, FIG. 1B, preferably substitutes unique row identifier bryv-120, FIGS. 2 and 3 of row descriptor properties 38 with the natural language description "Expected Profit in Stocks"-154 and substitutes with unique column identifier khqx-46 with "June 2014"-42. Thus, cell 70 is identified as "Expected Profit in Stocks @June 2014" indicated at 156. The result is system 10 displays cell 70 and formula 94 in natural language terms to yield the expression "Expected Profit in Stocks @June 2014=Rate of Return*Allocation to Stocks"-158.

In the example above, natural language module 152 expressed user-defined formula 94 in natural language terms. In other examples, natural language module may express the user-defined formula in abbreviated terms, e.g., "ROR*Stocks" as discussed above and shown in FIGS. 2-4.

Figure 4:
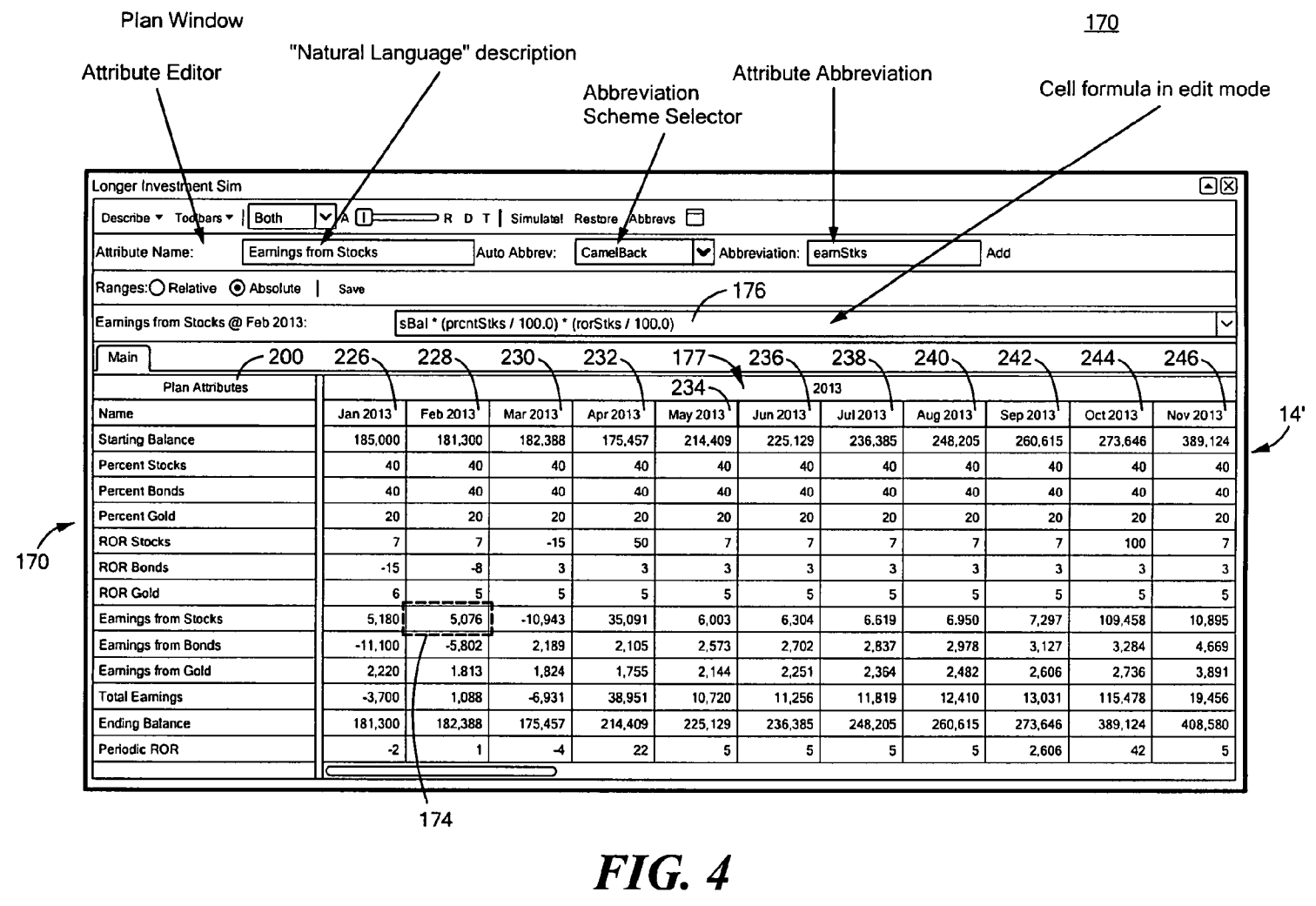

View 170, FIG. 4, shows one exemplary example of plan 14' including a plurality of row descriptors 170 each including a plurality of row descriptor properties, similar as discussed above with reference to FIGS. 2 and 3. Plan 14' also includes a plurality of column descriptors 172 each including a plurality of column descriptor properties. In this example, the user has clicked on cell 174 and the corresponding user-defined formula 176 expressed in abbreviated terms associated with cell 174 is displayed as shown.

Figure 5:
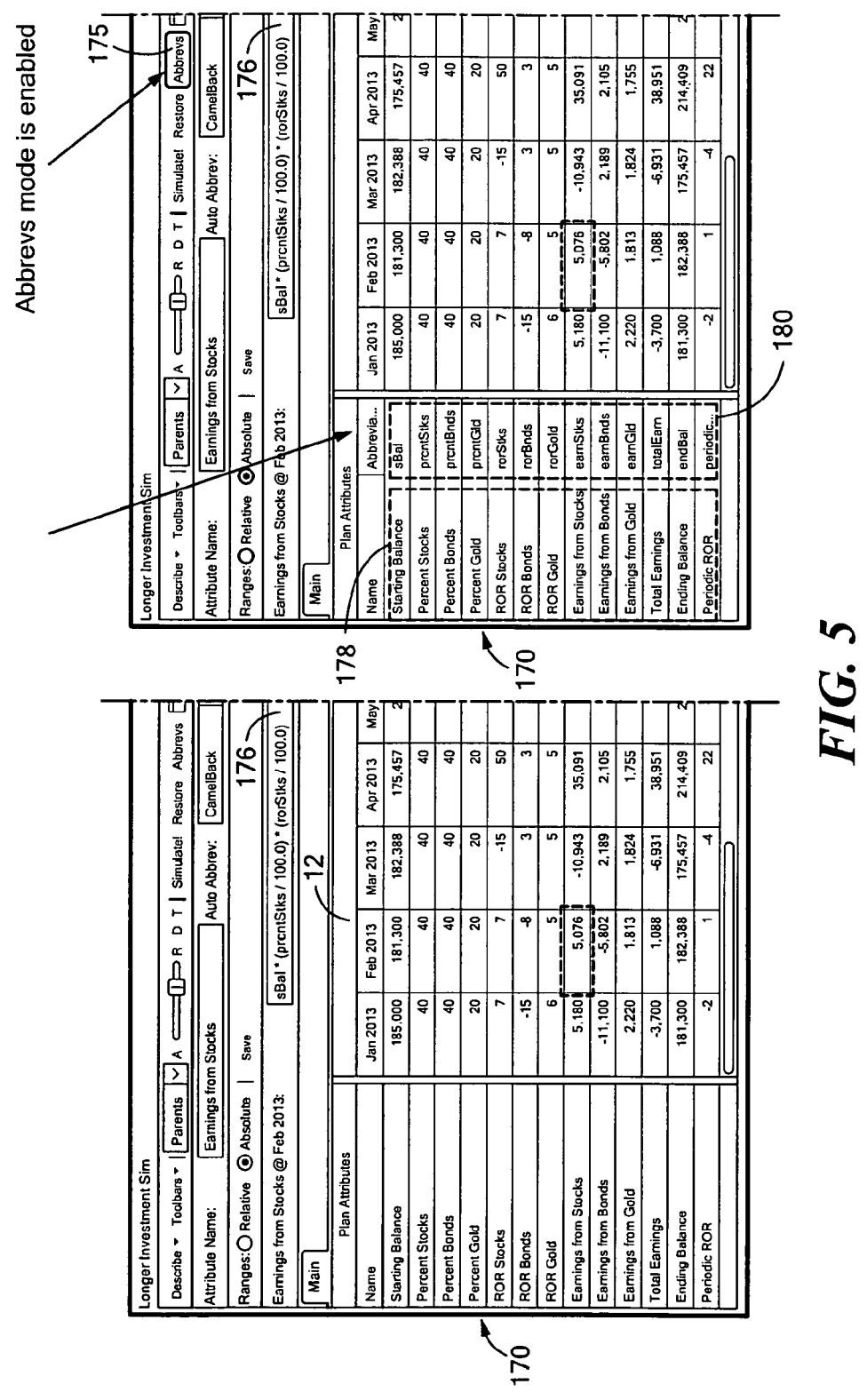

FIG. 5 shows examples of some of the row descriptor properties associated with each of row descriptors 170, e.g., the natural language description, indicated at 178 and the corresponding abbreviation for the natural language description, indicated at 180, enabled by clicking Abbrevs button 175. Each of the row descriptors 170, FIG. 4, have a unique row descriptor identifier and each of column descriptors 172 have a unique column descriptor identifier (not shown), similar as discussed above.

Natural language report module 152, FIG. 1B, then substitutes any unique row identifier and/or any unique column descriptor identifier in formula 176, FIG. 4, similar as discussed above with reference to one or more of FIGS. 1A-3, with the corresponding natural language description to render user-defined formula 176 in natural language terms or abbreviated terms, e.g., as shown at 180, FIG. 6.

The result is integrated, configurable, analytical, temporal, visual electronic plan system 10 of one or more embodiments of this invention displays user-defined formulas associated with plan 14 and in natural language terms that are easy to understand such that financial modeling can be easily performed. System 10 provides for improved understanding of the financial model associated with the plan and highly derived values and complex high order relationships between various aspects of the model are more easily discerned. System 10 allows the user to build sophisticated models with complex formulaic relationships between various aspects of the model with the user-defined formulas displayed with meaning that is easy to comprehend. Thus, cryptic formulas like +A2/C3*K2 are eliminated. System 10 also identifies each of the cells with natural language terms or abbreviated terms using row descriptor properties and column descriptor properties that are easy to understand.

In one embodiment, one or more of the row descriptors discussed above with reference to at least FIGS. 2-6 may be used to define one or more plan attributes. For example, one or more row descriptors 16, 30, 32, and 34, FIG. 2, or one or more row descriptors 170, FIG. 4, may be used to define Plan Attribute 1 (RD1), FIG. 3, Plan Attribute 2 (RD2), Plan Attribute 3 (RD3), and Plan Attribute 4 (RD4) or Plan Attributes 200, FIG. 4.

In one design, one or more column descriptors, e.g., column descriptors 20, 50, 52, FIG. 2, or column descriptors 172, FIG. 4, may be used to define one or more time points, e.g., Time 1 (CD1), FIG. 3, Time 2 (CD2), or Time 3 (CD3), or time points 226, 228, 230, 232, 234, 236, 238, 240, 242, 244, and 246, FIG. 4. Although as shown in this example, one or more row descriptors 18, 36, 38, 40, FIG. 3, or row descriptors 170, FIG. 4, may define plan attributes and one or more column descriptors 20, 50 and 52, FIG. 3, or column descriptors 172, FIG. 4, may define one or more time points, this is not a necessary limitation of this invention. In other examples, one or more row descriptors 18, 36, 38, 40 FIG. 2, or row descriptors 170, FIG. 4, may be used to define one or more time points and one or more of column descriptors 20, 50, 52, FIG. 2, or column descriptors 172, FIG. 4, may define one or more plan attributes.

In one example, time point specifiers may be included in the user-defined formula to make reference to the value of a cell not in the same time point as the current cell having the user-defined formula. This is achieved by adding the time point qualifier (+n/−n) to the abbreviation in the user-defined formula to specify a cell location in relative terms or with a column descriptor abbreviation to specify a particular cell in fixed terms. For example, user-defined formula 102, FIGS. 2-3, in cell 78 includes the term accStockPL(−1), where the "(−1)" is a time point specifier which refers to the time point for the prior cell 76, "June 2014"-44 which is expressed by natural language report module 152 as "from prior period", as shown by expression 164, FIG. 3. In another example, the time point specifier may be a column descriptor abbreviation, e.g., accStockPL(June 2014), where "June 2014"-44 is the column descriptor indicated at 44, FIGS. 2-3. If no time point specifiers are included, all of the values are assumed to come from the same point in time as the current cell having the user-defined formula. Formula parser 150 preferably determines the relationships/dependencies between the various cells when a time point specifier is used.

System 10, FIGS. 1A and 1B, preferably includes column descriptor module 300, FIG. 1A, responsive to user input configured to define one or more of column descriptors 20, 50, 52, and 172, FIGS. 2-4, each including a plurality of column descriptor properties as discussed above. To enter the column descriptors, the user need only enter the natural language description for the column descriptor. Column descriptor module 300 then automatically assigns an abbreviation and unique column identifier for column descriptor.

System 10 also preferably includes time point defining module 302 responsive to column descriptor module 300 configured to define a time point or a series of time points discussed above with reference to FIGS. 3 and 4.

System 10 also preferably includes row descriptor module 304 responsive to user input configured to define one or more row descriptors, e.g., row descriptors 16, 30, 32, and 34, FIGS. 2 and 3, or row descriptors 170, FIG. 4, each including a plurality of row descriptor properties including a natural language description, an abbreviation, and a unique row identifier as discussed above. To enter the row descriptors, the user need only enter the natural language description for the row descriptor. Row descriptor module 304 then automatically assigns an abbreviation and unique row identifier for row descriptor.

System 10 also preferably includes attribute definer 306, responsive to row descriptor module 304 configured to define one or more plan attributes, discussed above with reference to FIGS. 2-4. System 10 also preferably includes time point processor 333, attribute processor 335, and calculator engine 337.

System 10 also includes formula defining module 308 responsive to user input configured to define user-defined formulas discussed above.

Preferably, as discussed above, column descriptor module 300 and row descriptor module 304 include the ability to automatically assign unique abbreviation properties to the row descriptors and column descriptors, respectively. The user can choose between a variety of naming schemes and modules 300 and 304 will ensure that the abbreviations are unique. This preferably facilitates the authoring process, allowing the user the focus on the natural language descriptions.

In one embodiment, natural language report module 152, FIG. 1B, preferably determines which cells in plan 14, 14', FIGS. 3 and 4, are relevant to the user-defined time point, step 310. Natural language report module 152 then assembles a plurality of the user-defined formula associated with one or more cells relevant to the user-defined time period, step 312. Natural language report module 152 then substitutes any unique row descriptor identifier and/or any unique column descriptor identifier in the plurality of user-defined formula with the corresponding natural language description or abbreviation to render the plurality of user-defined formula in natural language or abbreviated terms, similar as discussed above, step 314. Natural language report module 152 also preferably factors out required but repetitive formula in step 314, and preferably organizes the generalized natural language terms according to cell type, e.g., a root cell (cells having no computational parents), dependent cells (cells having one or more computational parents) or terminal cells (cells having no children) and displays the results, step 316. FIG. 7 shows view 340 of an exemplary time point report generated by system 10 where all natural language formula for a selected time point, in this example, May 2013, indicated at 313, are grouped together by root cells 342 and dependent cells 344. As shown at 345, all of the formulae and computed values of the formula for plan 14', FIG. 4, of the user selected time point are shown in generalized natural language terms which are easy to read and comprehend by the user to provide for easy financial modeling and analysis.

Figure 8:
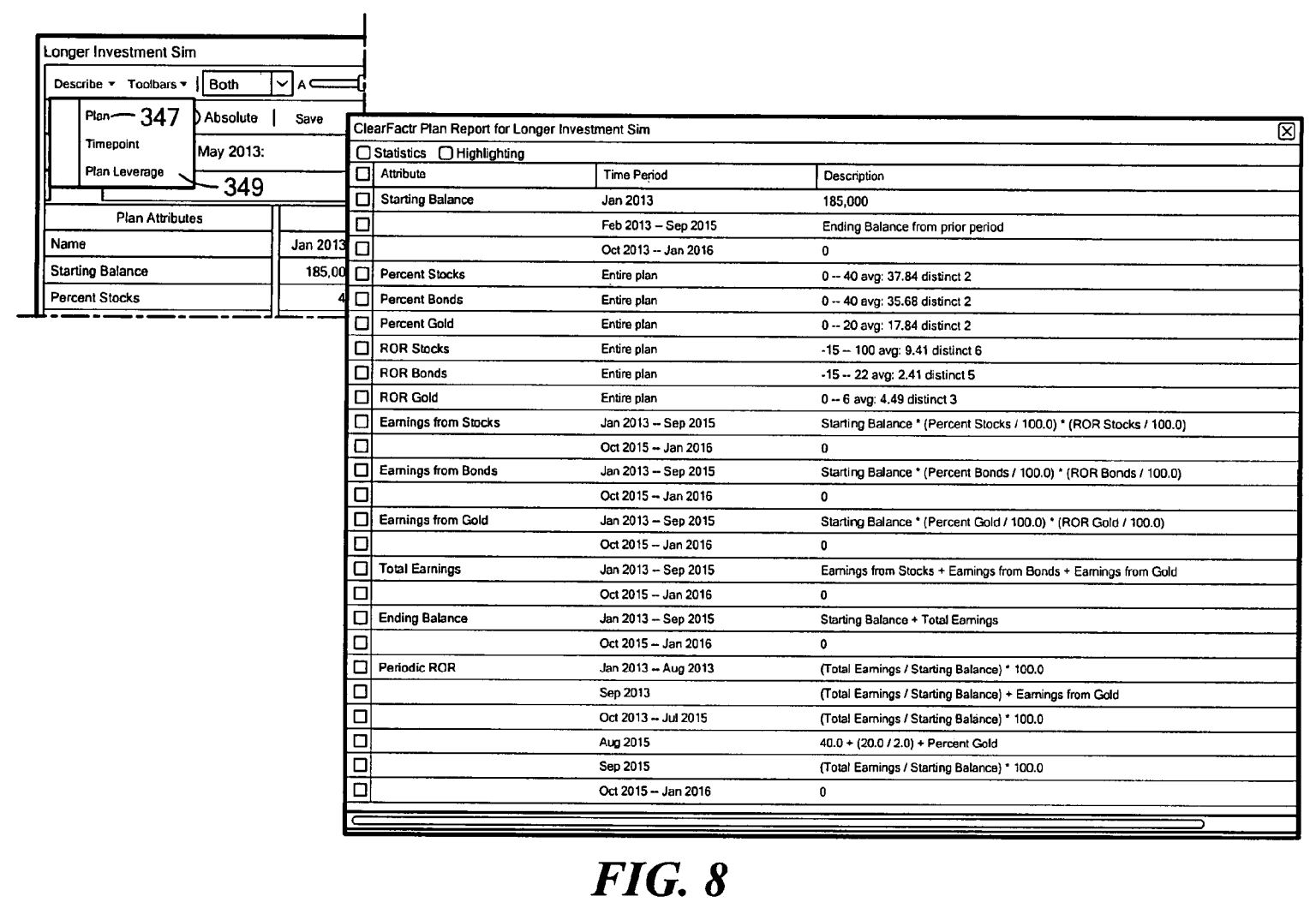

FIG. 8 shows an example of a user clicking plan 347 from Describe menu 349 such that system 10 generates a self-describing spreadsheet plan report generated by where all natural language formulae for an entire plan, e.g., plan 14', FIG. 4, are shown with distinct time period range descriptions grouped by attributes.

System 10, FIGS. 1A and 1B, also preferably includes root cell display module 350, FIG. 1A, configured to visually highlight root cells. System 10 also preferably includes dependency display module 352 configured to visually highlight and display dependent cells. System 10 also preferably includes terminal display module 354 configured to visually highlight and display terminal cells. System 10 also includes ancestry display module 356 configured to display the ancestry of root cells, dependent cells, and terminal cells.

Figure 9:
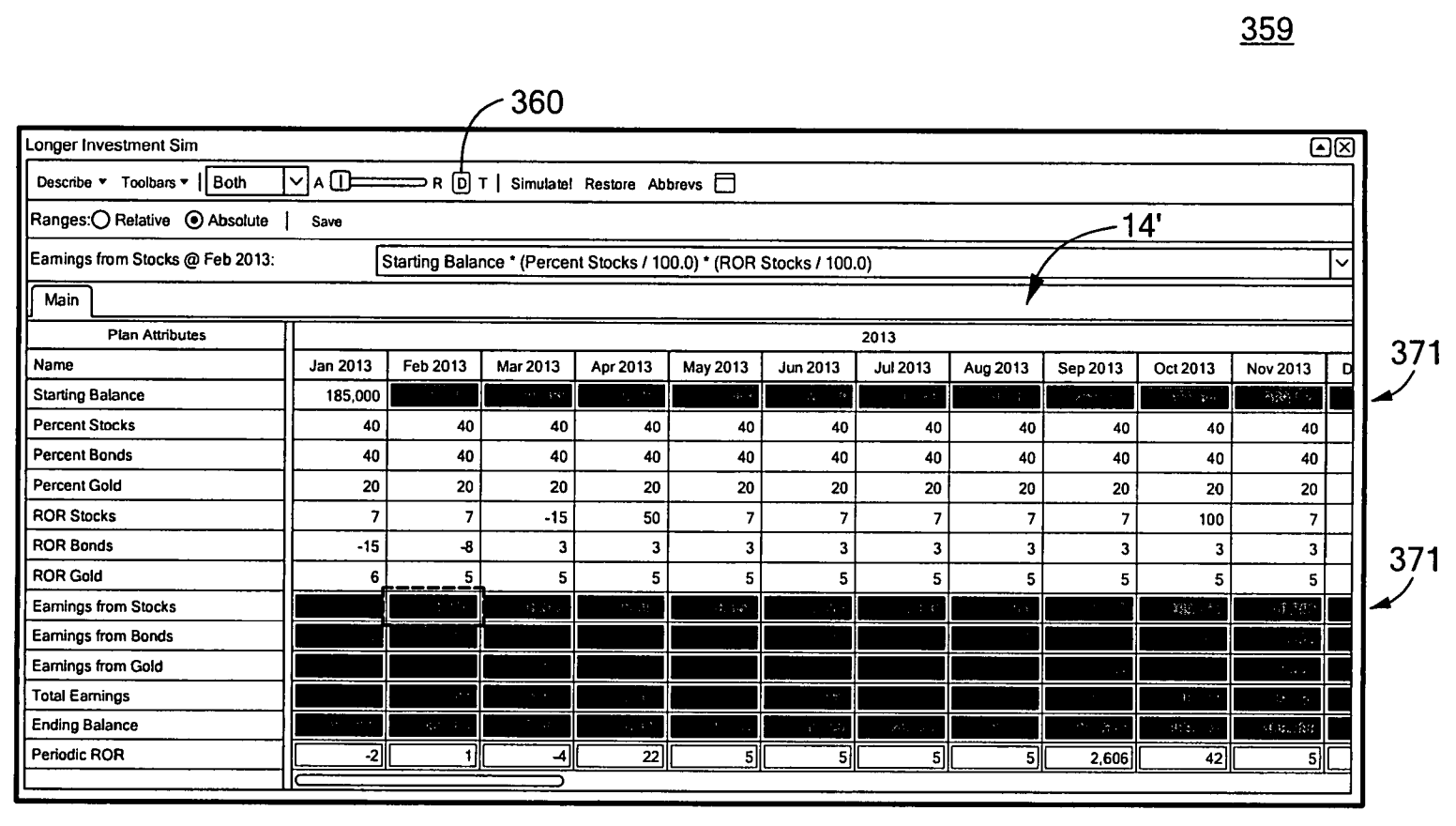
Figure 10:
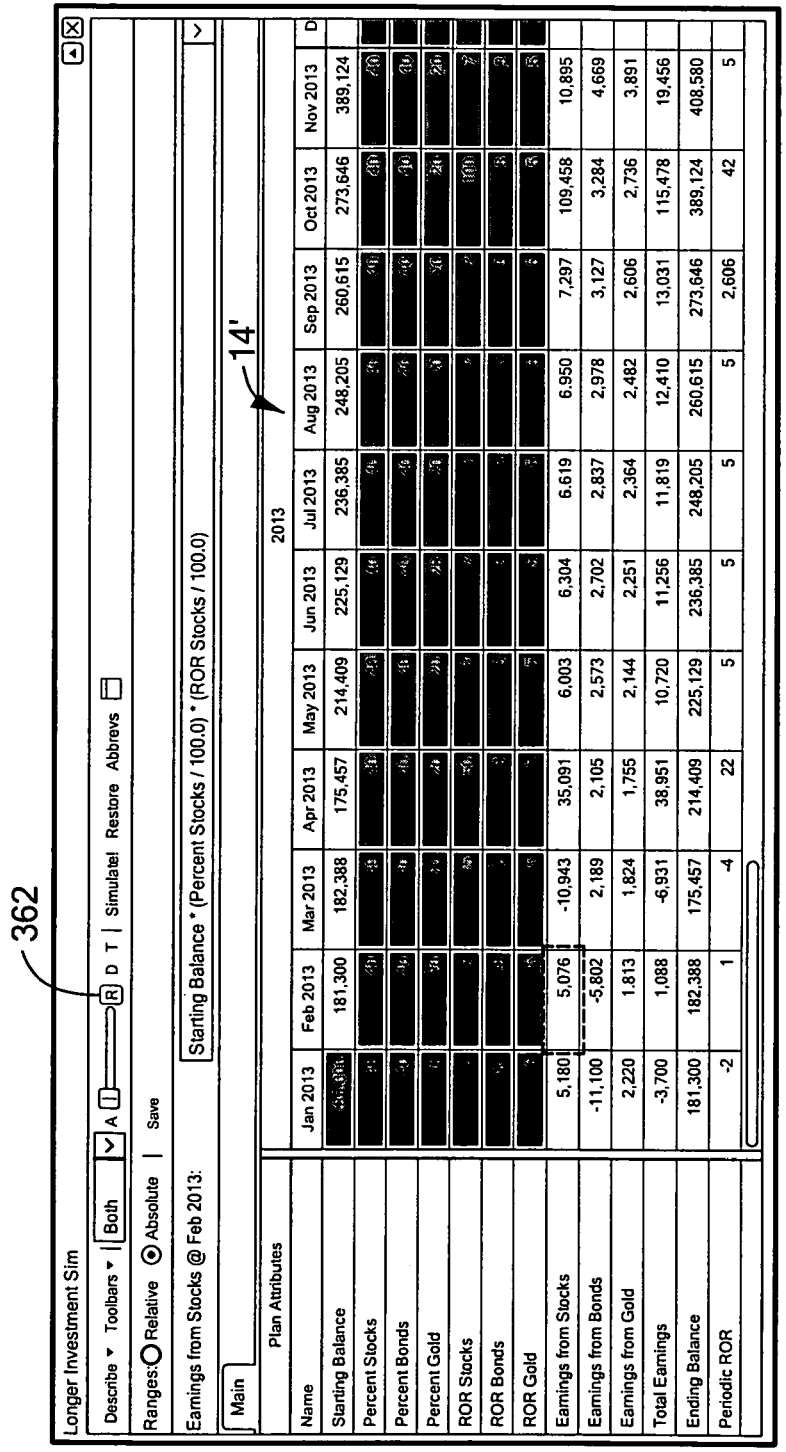
FIG. 10 is a view showing one example of the plan shown in FIG. 4 with root cells highlighted.
Figure 11:
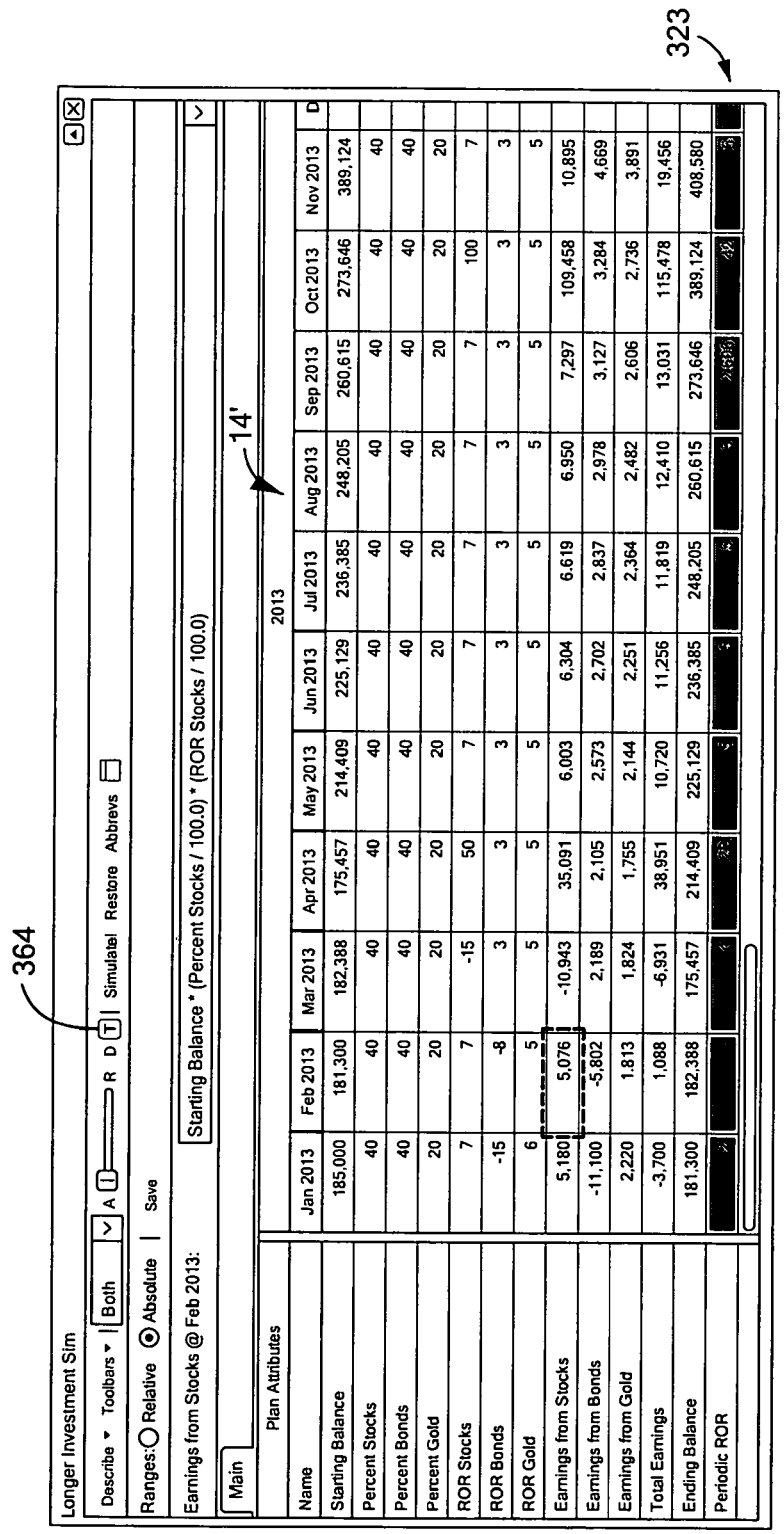
FIG. 11 is a view showing one example of the plan shown in FIG. 4 with terminal cells highlighted.
Figure 12:
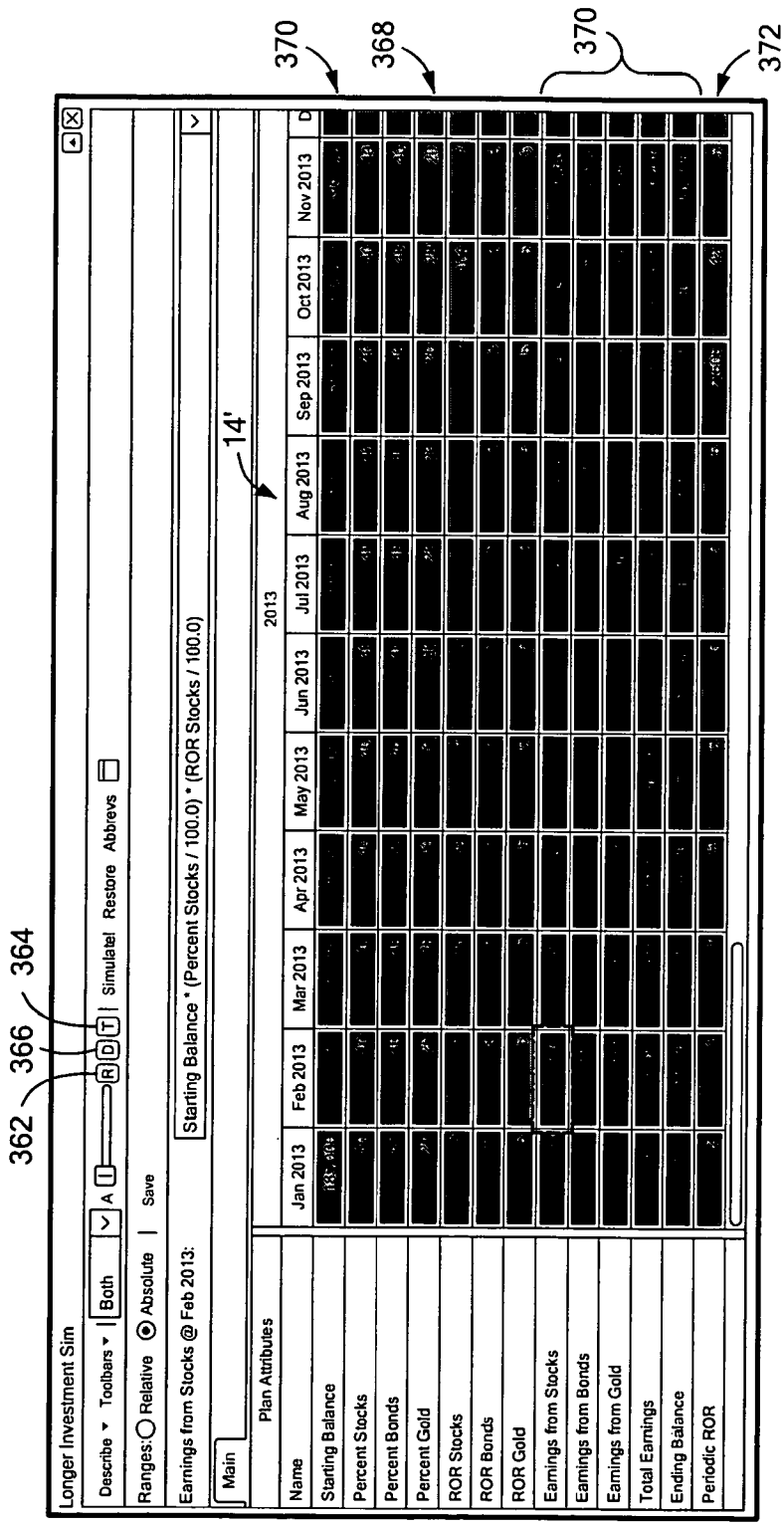
FIG. 12 is a view showing one example plan shown in FIG. 4 with root cells, dependent cells, and terminal cells highlighted.
Figure 14:
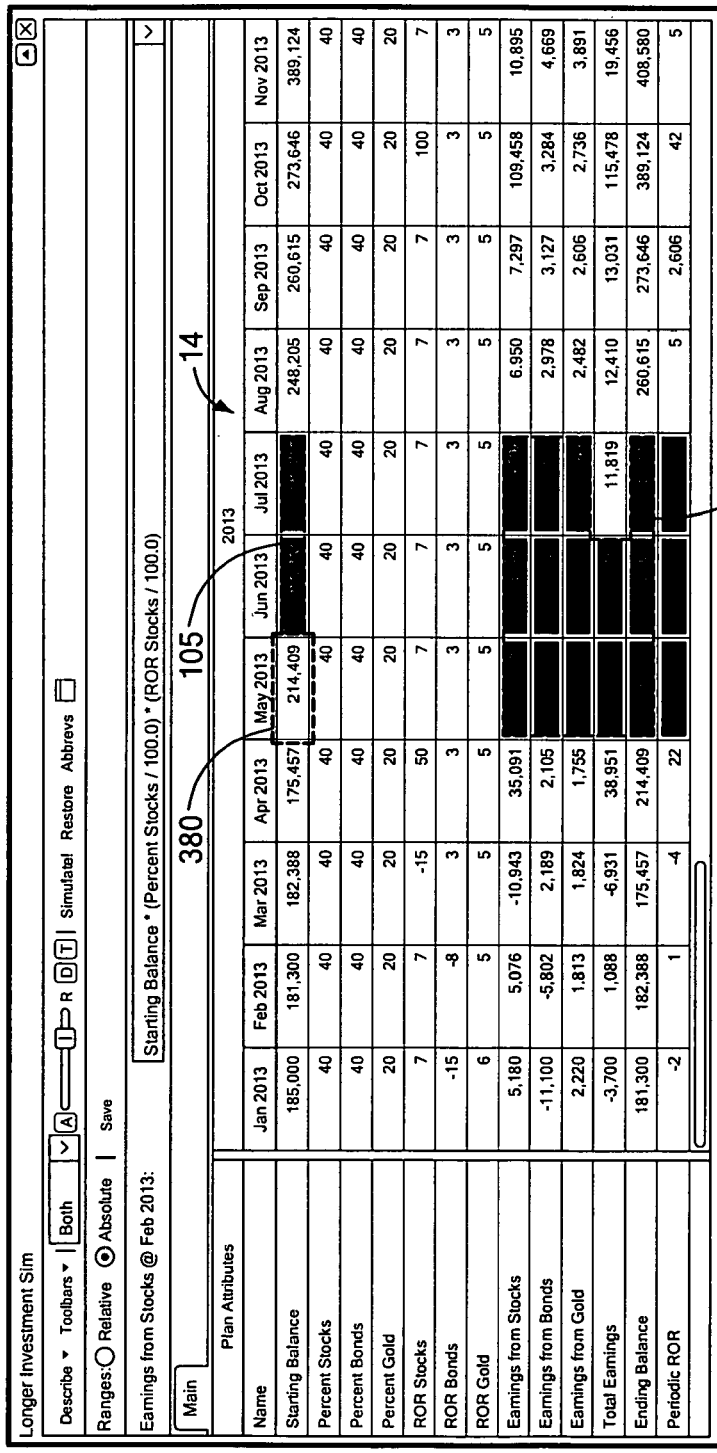
FIG. 14 is a view showing one example of the plan shown in FIG. 4 with ancestry highlighting enabled showing children cells of the current cell.
Figure 15:
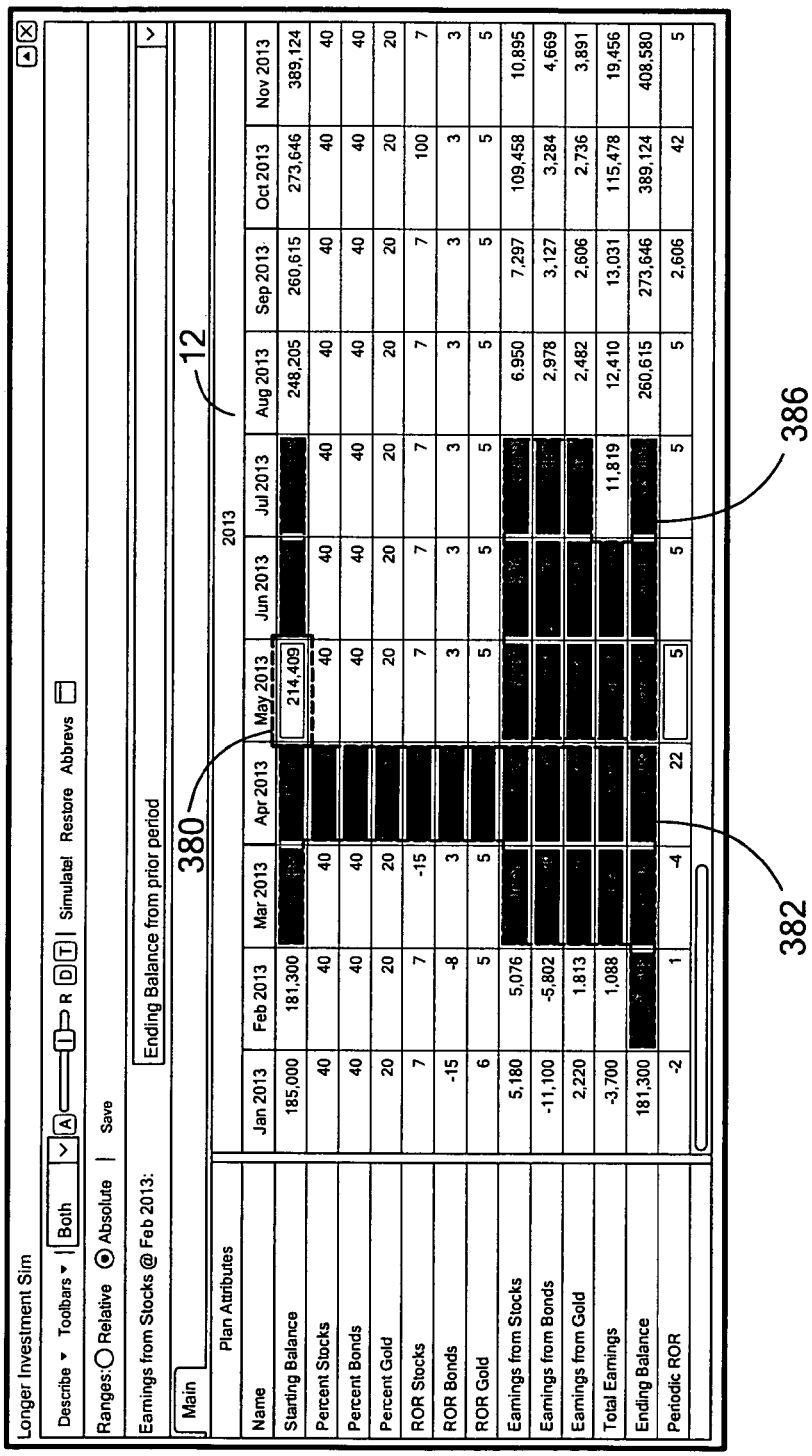
FIG. 15 is a view showing one example of plan shown in FIG. 4 with ancestry highlighting enabled showing both parent cells and children cells of a current cell.

FIG. 9 shows an example of view 359 wherein dependent display module 352, FIG. 1A, in response to a user clicking D-Selector button 360, FIG. 9, has visually highlighted all the dependent cells of plan 14' indicated at 371. FIG. 10 shows an example wherein root cell display module 350, FIG. 1A, in response to user clicking R-Selector button 362, FIG. 10, has visually highlighted all the root cells of plan 14' as shown. FIG. 11 shows an example wherein terminal cell display module 354, FIG. 1A, in response to a user clicking T-Selector button 364, FIG. 11, has visually highlighted all the terminal cells of plan 14' as shown at 373. FIG. 12 shows an example wherein root cell display module 350, FIG. 1A, depended cell display module 352 and terminal cell display module 354, FIG. 1A, in response to a user clicking D-Selector button 366, FIG. 12, R-Selector button 362 and T-Selector button 364, has visually highlighted all the root, dependent, and terminal cells of plan 14', indicated at 368, 370, and 372, respectively. FIG. 13 shows an example wherein ancestry display module 356, FIG. 1A, has visually highlighted the parent ancestry of cell 380, FIG. 14, of plan 14' as shown by the gradient highlighting indicated at 382. FIG. 14 shows an example wherein ancestry display module 356, FIG. 1A, has visually highlighted the child ancestry of cell 380, FIG. 14, of plan 14' as shown by the gradient highlighting indicated at 386. FIG. 15 shows an example wherein ancestry display module 356, FIG. 1A, has visually highlighted both the parent and child ancestry of cell 380, FIG. 15, as shown by gradient highlighting indicated at 382 for the parent ancestry and gradient highlighting indicated at 386 for the child ancestry.

FIG. 16 depicts an example of view self-describing spreadsheet plan report generated by system 10, FIGS. 1A and 1B, showing the optional highlighting of root and dependent cell ranges indicated by shading or color scheme, indicated at 390 and 392. FIG. 16 also shows row descriptor properties 170 and column descriptor properties 172 and series of time points 226-246 discussed above with reference to FIG. 4.

Figure 17:
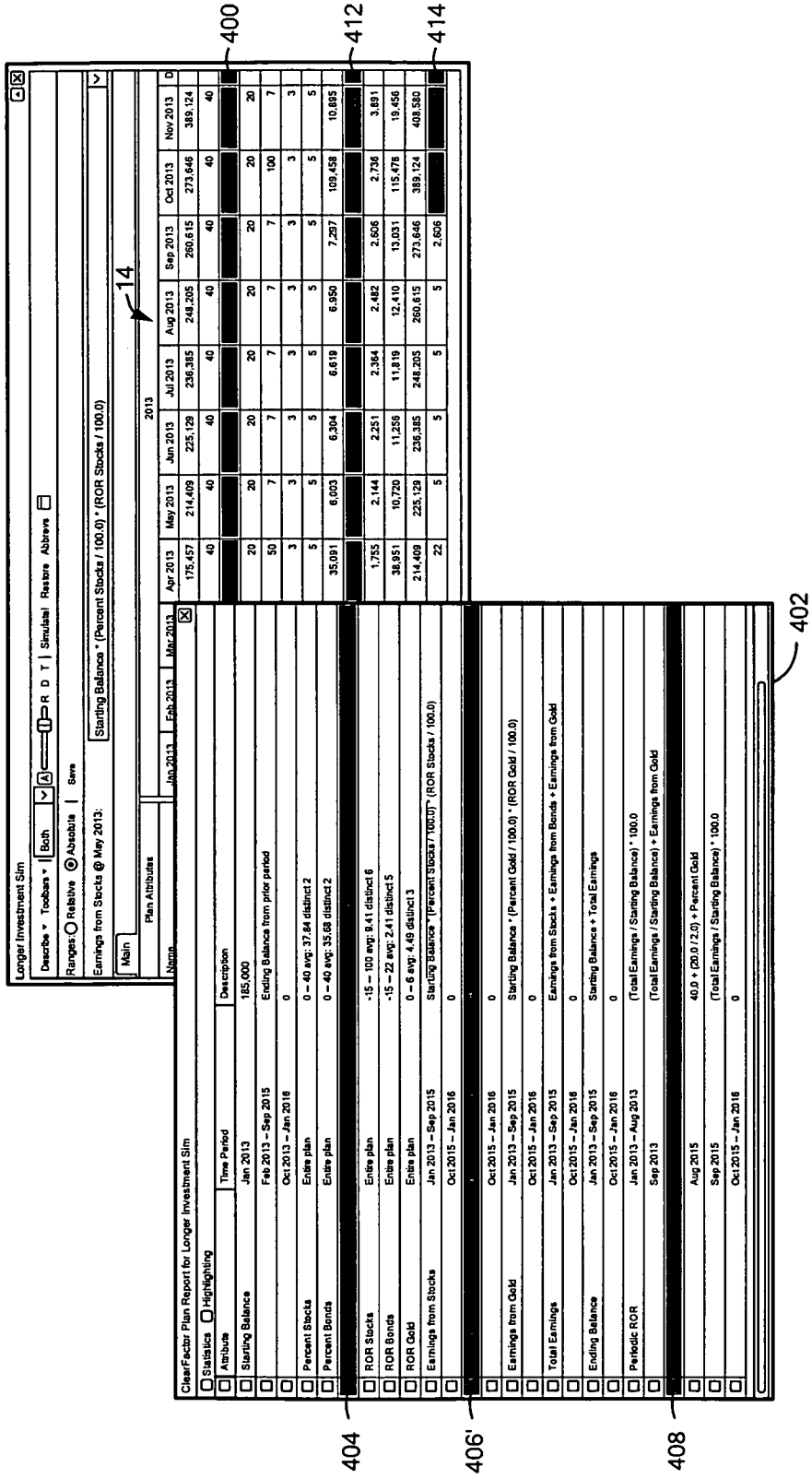
FIG. 17 is a view showing another example of a self-describing spreadsheet plan report generated by the system shown in one or more of FIGS. 1A-15.

FIG. 17 shows one example of a self-describing spreadsheet plan report 402 generated by system 10, FIGS. 1A and 1B, which can function as a selection mechanism for the plan. In this example, three time periods are selected on report 402, indicated at 404, 406, and 408, and the corresponding ranges are highlighted in plan 14' using consistent root and dependent cell highlighting, indicated at 410, 412 and 414.

Although, as discussed above with reference to at least FIG. 5, a user may enter a formula using abbreviations for the plan attributes using formula defining module 308 and the formula editor, this is not necessarily a limitation of this invention. In other embodiments, the user may use an autocomplete box drop-down to enter a letter or letters associated with the abbreviation of the row descriptor properties or column descriptor properties to be used in the user-defined formula, e.g., as shown by a user entering for "RO" and auto-complete drop-down box 420, FIG. 18, displays all of the abbreviations for row descriptors and/or column descriptors that begin with RO as shown.

Each of the one or more cells of plan 14, 14', shown in one or more of FIGS. 1A-17 preferably includes a unique cell identifier, e.g., cell 58, FIG. 2, including the unique cell identifier xx2q-333. In this example, each of cells 60-80 also have a unique cell identifier (not shown).

The user-defined formulas discussed above with reference to at last FIGS. 2-4, may be rendered with abbreviations for editing or rendered in natural language form for reporting. The user-defined formulas may also be rendered with encoding (for persistence) using the unique row descriptor identifiers, and/or column descriptor identifiers, e.g., @aid(zxqx) *@aid(9cy5) for user-defined formula 94, FIGS. 2 and 3. The encoding makes use of a private function in which parser 150, FIG. 1A, interprets to map that particular expression token to a particular property of a row descriptor or column descriptor. Formula defining module 308, FIG. 1B, a formula editor, and parser 150 allows the user to define cells that can contain formulas that relate cells to each other by using properties of the row descriptors and the column descriptors. In the abbreviations mode, this provides for easy semantic editing in a manner familiar to legacy spreadsheet syntax. In the encoded mode, the formula editor of system 10 provides for easy management and natural language and abbreviated mode rendering of the user-defined formulas. Abbreviations used during the creation of formulas are automatically created but can be changed by the user due to the use of the unique column descriptor identifiers and/or the unique row descriptor identifiers. The formulas can be rendered in different styles and the natural language descriptions and/or abbreviations can be modified without breaking the relationship between cells and without breaking formulas. The result is system 10 provides the user with the ability to see natural language formulas derived from traditional looking spreadsheet formulas. That is, the user-defined formulas are represented by their abbreviations rather than meaningless references like "D4" and "G4" as found in conventional spreadsheets. The result is the user can easily apply a consistent formula to a specific range of cells that may not be in the entire row or column and easily apply an exceptional or different formula to a particular cell within a larger range. System 10 also can generate a report of all cell relationships in a plan where the descriptions have been analyzed and characterized according to the time period for which they apply. The data model allows for changes to be made to the natural language and abbreviation properties of the row descriptors and column descriptors that are automatically rendered to any formulas that reference them without having to reconfigure and/or persist new versions of those formulas.

For enablement purposes only, the incorporated by reference computer program listing appendix code portions are provided which can be executed on one or more processor, a computing device, or computer to carry out the primary steps and/or functions of an integrated, configurable, analytical, temporal, visual electronic plan system 10 and methods thereof discussed above with reference to one or more of FIGS. 1A-18 and recited in the claims hereof. Other equivalent algorithms and code can be designed by a software engineer and/or programmer skilled in the art using the information provided herein.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A method executed on a computing device comprising:
    assigning one or more row descriptors each including a plurality of row descriptor properties to one or more rows of an electronic plan, wherein the electronic plan comprises an electronic spreadsheet which includes a temporal component;
    assigning one or more column descriptors each including a plurality of column descriptor properties to one or more columns of the electronic plan;
    mapping one or more cells to one of the row descriptors using a unique row descriptor identifier and to one of the column descriptors using a unique column descriptor identifier, each of the one or more cells including a user-defined formula that references one or more other cell, the user-defined formula including the unique row descriptor identifier and the unique column descriptor identifier from the one or more other cells, the one or more other cells initially expressed by an abbreviation associated with a row descriptor and/or an abbreviation associated with a column descriptor;
    translating the abbreviation for the row descriptor and/or the abbreviation for the column descriptor to its corresponding unique row descriptor identifier and/or unique column descriptor identifier; and
    substituting any unique row descriptor identifier and/or any unique column descriptor identifier in the user-defined formula with a corresponding natural language description to render the user-defined formula in natural language terms, wherein the unique row descriptor identifiers differ from the corresponding row descriptors and the unique column descriptor identifiers differ from the corresponding column descriptors, and wherein using the unique row descriptor identifiers and the unique column descriptor identifiers, changes to the natural language descriptions are automatically rendered to any formulas that reference them;
    rendering each user-defined formula with encoding that uses the corresponding unique row descriptor identifier and/or unique column descriptor identifier, the encoding using a private function in which a parser maps a formula token to a particular property of the corresponding row descriptor and/or column descriptor;
    determining which cells in the plan are relevant to a predefined time point;
    assembling a plurality of the user-defined formulas associated with the determined cells in the plan;
    generating a self-describing spreadsheet plan report identifying the plurality of the user-defined formulas with natural language descriptions in the plan;
    displaying, in a graphical user interface, the report.

2. The method of claim 1, wherein the report is generated by
    substituting any unique row descriptor identifier and/or any unique column descriptor identifier in the plurality of user-defined formulas with the corresponding natural language description to render the plurality of user-defined formulas in natural language terms.

3. The method of claim 2, wherein the report is further generated by factoring out required but repetitive formulas in the plan.

4. The method of claim 3, wherein the report is further generated by organizing the natural language terms according to cell type within the plan.

5. The method of claim 1 further comprising receiving user-generated input, via the graphical user interface, defining one of the column descriptors.

6. The method of claim 5 further comprising:
receiving user-generated input, via the graphical user interface, including at least one user-defined time period associated with the plan;
wherein, in response to the received user-generated input, the user-defined period subsequently acts as a descriptor property for the corresponding column.

7. The method of claim 6 further comprising:
determining which of the one or more cells are relevant to the user-defined time period; and
organizing the natural language terms according to row type for all time points in the plan to provide a comprehensive view of the data and formulaic relationships of the entire plan.

8. The method of claim 1 further comprising receiving user-generated input, via the graphical user interface, defining one of the row descriptors.

9. A system comprising:
at least one data processor; and
memory storing instructions which, when executed by the at least one data processor, implement operations comprising:
assigning one or more row descriptors each including a plurality of row descriptor properties to one or more rows of an electronic plan, wherein the electronic plan comprises an electronic spreadsheet which includes a temporal component;
assigning one or more column descriptors each including a plurality of column descriptor properties to one or more columns of the electronic plan;
mapping one or more cells to one of the row descriptors using a unique row descriptor identifier and to one of the column descriptors using a unique column descriptor identifier, each of the one or more cells including a user-defined formula that references one or more other cell, the user-defined formula including the unique row descriptor identifier and the unique column descriptor identifier from the one or more other cells, the one or more other cells initially expressed by an abbreviation associated with a row descriptor and/or an abbreviation associated with a column descriptor;
translating the abbreviation for the row descriptor and/or the abbreviation for the column descriptor to its corresponding unique row descriptor identifier and/or unique column descriptor identifier; and
substituting any unique row descriptor identifier and/or any unique column descriptor identifier in the user-defined formula with a corresponding natural language description to render the user-defined formula in natural language terms, wherein the unique row descriptor identifiers differ from the corresponding row descriptors and the unique column descriptor identifiers differ from the corresponding column descriptors, and wherein using the unique row descriptor identifiers and the unique column descriptor identifiers, changes to the natural language descriptions are automatically rendered to any formulas that reference them;
rendering each user-defined formula with encoding that uses the corresponding unique row descriptor identifier and/or unique column descriptor identifier, the encoding using a private function in which a parser maps a formula token to a particular property of the corresponding row descriptor and/or column descriptor;
determining which cells in the plan are relevant to a predefined time point;
assembling a plurality of the user-defined formulas associated with the determined cells in the plan;
generating a self-describing spreadsheet plan report identifying the plurality of the user-defined formulas with natural language descriptions in the
displaying, in a graphical user interface, the report.

10. The system of claim 9, wherein the report is generated by substituting any unique row descriptor identifier and/or any unique column descriptor identifier in the plurality of user-defined formulas with the corresponding natural language description to render the plurality of user-defined formulas in natural language terms.

11. The system of claim 10, wherein the report is further generated by factoring out required but repetitive formulas in the plan.

12. The system of claim 11, wherein the report is further generated by organizing the natural language terms according to cell type within the plan.

13. The system of claim 9, wherein the operations further comprise receiving user-generated input, via the graphical user interface, defining one of the column descriptors.

14. The system of claim 13, wherein the operations further comprise:
receiving user-generated input, via the graphical user interface, including at least one user-defined time period associated with the plan;
wherein, in response to the received user-generated input, the user-defined period subsequently acts as a descriptor property for the corresponding column.

15. The system of claim 14, wherein the operations further comprise:
determining which of the one or more cells are relevant to the user-defined time period; and
organizing the natural language terms according to row type for all time points in the plan to provide a comprehensive view of the data and formulaic relationships of the entire plan.

16. The system of claim 9, wherein the operations further comprise receiving user-generated input, via the graphical user interface, defining one of the row descriptors.

17. A computer program product comprising a non-transitory computer-readable storage medium storing instructions which, when executed by at least one data processor forming part of at least one computing device, implement operations comprising:
assigning one or more row descriptors each including a plurality of row descriptor properties to one or more rows of an electronic plan, wherein the electronic plan comprises an electronic spreadsheet which includes a temporal component;
assigning one or more column descriptors each including a plurality of column descriptor properties to one or more columns of the electronic plan;
mapping one or more cells to one of the row descriptors using a unique row descriptor identifier and to one of the column descriptors using a unique column descriptor identifier, each of the one or more cells including a user-defined formula that references one or more other cell, the user-defined formula including the unique row descriptor identifier and the unique column descriptor identifier from the one or more other cells, the one or more other cells initially expressed by an abbreviation associated with a row descriptor and/or an abbreviation associated with a column descriptor;

translating the abbreviation for the row descriptor and/or the abbreviation for the column descriptor to its corresponding unique row descriptor identifier and/or unique column descriptor identifier; and substituting any unique row descriptor identifier and/or any unique column descriptor identifier in the user-defined formula with a corresponding natural language description to render the user-defined formula in natural language terms, wherein the unique row descriptor identifiers differ from the corresponding row descriptors and the unique column descriptor identifiers differ from the corresponding column descriptors, and wherein using the unique row descriptor identifiers and the unique column descriptor identifiers, changes to the natural language descriptions are automatically rendered to any formulas that reference them;

rendering each user-defined formula with encoding that uses the corresponding unique row descriptor identifier and/or unique column descriptor identifier, the encoding using a private function in which a parser maps a formula token to a particular property of the corresponding row descriptor and/or column descriptor;

determining which cells in the plan are relevant to a predefined time point;

assembling a plurality of the user-defined formulas associated with the determined cells in the plan;

generating a self-describing spreadsheet plan report identifying the plurality of the user-defined formulas with natural language descriptions in the plan;

displaying, in a graphical user interface, the report.

18. The computer program product of claim 17, wherein the report is generated by substituting any unique row descriptor identifier and/or any unique column descriptor identifier in the plurality of user-defined formulas with the corresponding natural language description to render the plurality of user-defined formulas in natural language terms.

19. The computer program product of claim 18, wherein the report is further generated by factoring out required but repetitive formulas in the plan.

20. The computer program product of claim 19, wherein the report is further generated by organizing the natural language terms according to cell type within the plan.

21. The computer program product of claim 17, wherein the operations further comprise receiving user-generated input, via the graphical user interface, defining one of the column descriptors.

22. The computer program product of claim 21, wherein the operations further comprise:

receiving user-generated input, via the graphical user interface, including at least one user-defined time period associated with the plan;

wherein, in response to the received user-generated input, the user-defined period subsequently acts as a descriptor property for the corresponding column.

23. The computer program product of claim 22, wherein the operations further comprise:

determining which of the one or more cells are relevant to the user-defined time period; and organizing the natural language terms according to row type for all time points in the plan to provide a comprehensive view of the data and formulaic relationships of the entire plan.

24. The computer program product of claim 17, wherein the operations further comprise receiving user-generated input, via the graphical user interface, defining one of the row descriptors.

* * * * *